United States Patent
Mizushima et al.

(10) Patent No.: US 12,430,475 B2
(45) Date of Patent: Sep. 30, 2025

(54) COMPUTER AND DATA PROCESSING METHOD

(71) Applicant: Hitachi, Ltd., Tokyo (JP)

(72) Inventors: Nagamasa Mizushima, Tokyo (JP); Yoshihiro Yoshii, Tokyo (JP); Naoya Okada, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 266 days.

(21) Appl. No.: 18/112,079

(22) Filed: Feb. 21, 2023

(65) Prior Publication Data

US 2024/0078347 A1    Mar. 7, 2024

(30) Foreign Application Priority Data

Sep. 6, 2022 (JP) ................. 2022-141346

(51) Int. Cl.
| | |
|---|---|
| *G06F 21/78* | (2013.01) |
| *G06F 21/60* | (2013.01) |
| *G06F 21/64* | (2013.01) |

(52) U.S. Cl.
CPC ............ *G06F 21/78* (2013.01); *G06F 21/602* (2013.01); *G06F 21/64* (2013.01)

(58) Field of Classification Search
CPC ......... G06F 21/78; G06F 21/602; G06F 21/64
USPC .......................................................... 726/26
See application file for complete search history.

(56) References Cited

U.S. PATENT DOCUMENTS

| | | | |
|---|---|---|---|
| 8,194,854 B2 | 6/2012 | Gueron et al. | |
| 10,320,558 B2 | 6/2019 | Leventhal et al. | |
| 2021/0264063 A1* | 8/2021 | Monji | G06F 21/85 |
| 2022/0283731 A1* | 9/2022 | Yoo | G06F 3/0659 |
| 2023/0342121 A1* | 10/2023 | Wilkinson | H04L 9/0618 |

FOREIGN PATENT DOCUMENTS

JP       2021-132342 A       9/2021

OTHER PUBLICATIONS

Japanese Office Action received in corresponding Japanese Application No. 2022-141346 dated May 28, 2024.

* cited by examiner

*Primary Examiner* — Linglan Edwards
*Assistant Examiner* — Phuc Pham
(74) *Attorney, Agent, or Firm* — Mattingly & Malur, PC

(57) ABSTRACT

A computer includes a processor including a plurality of registers, a memory, and a storage medium. A processor of a computer is configured to execute an encryption process of generating encrypted user data including a plurality of encrypted data blocks using the plurality of registers, and add a DIF including CRC to the encrypted data blocks and store the result in a storage medium. The encryption process includes repeatedly executing a first process of reading partial data from a predetermined number of the data blocks and storing the partial data in a first register, a second process of storing encrypted partial data obtained by encrypting the partial data stored in the first register in a second register, and a third process of executing an operation for calculating CRC using the encrypted partial data stored in the second register and storing a result of the operation in a third register.

15 Claims, 13 Drawing Sheets

FIG. 2C
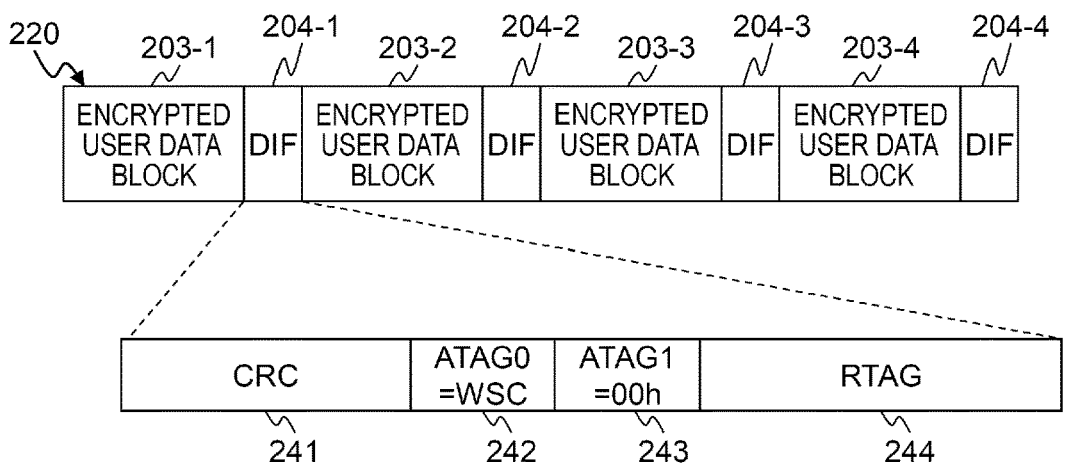
FIG. 3A
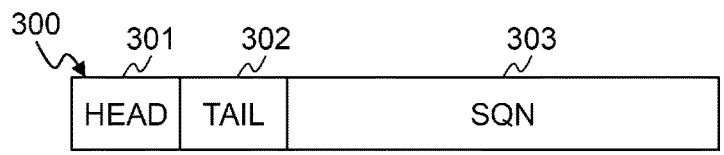
FIG. 3B
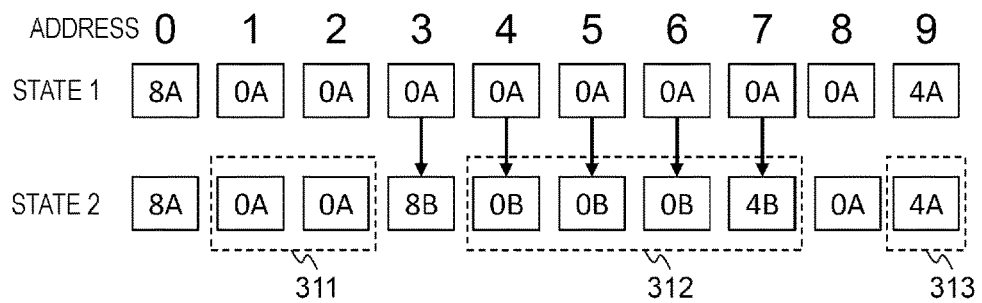
FIG. 3C
| # | OWN WSC | PREVIOUS WSC | INSPECTION |
|---|---|---|---|
| (R1) | H/T=1/0 or 1/1 | — | NO |
| (R2) | H/T=0/0 or 0/1 | H/T=0/1 | NO |
| (R3) | | H/T=0/0 | PREVIOUS WSC AND SQN MATCH? |
| (R4) | | H/T=1/0 | PREVIOUS WSC AND SQN MATCH? |
| (R5) | | H/T=1/1 | NO |

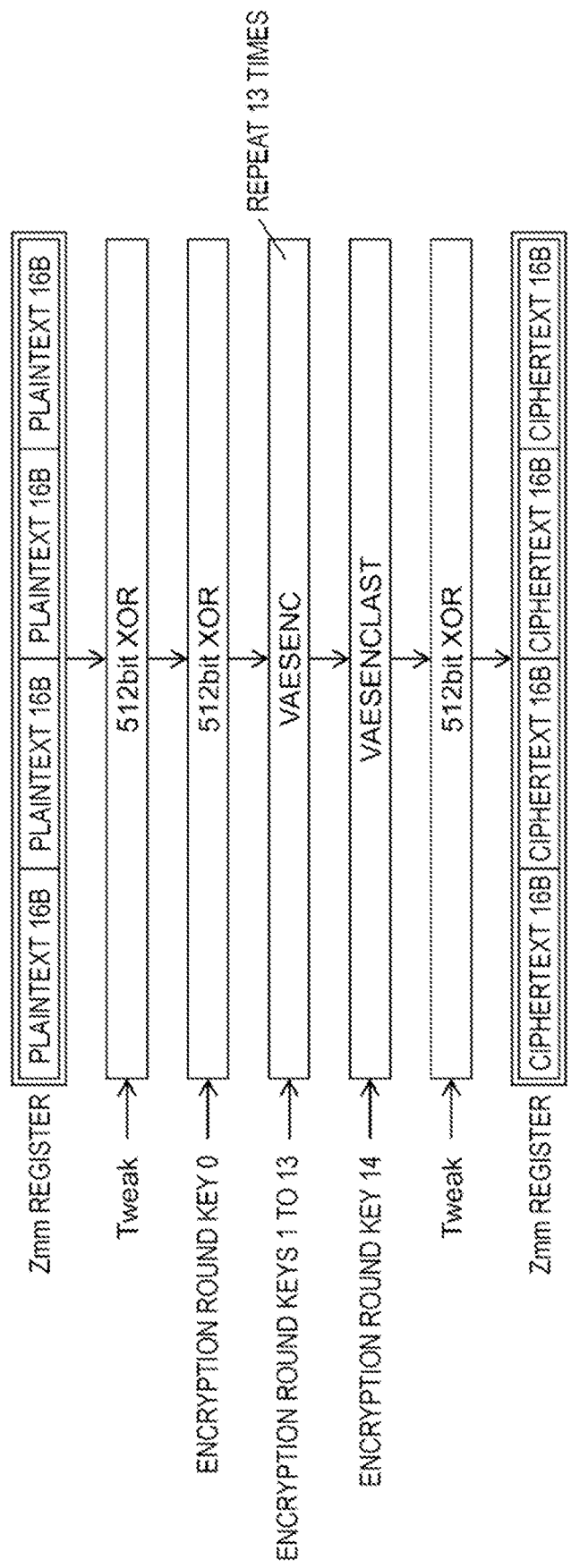

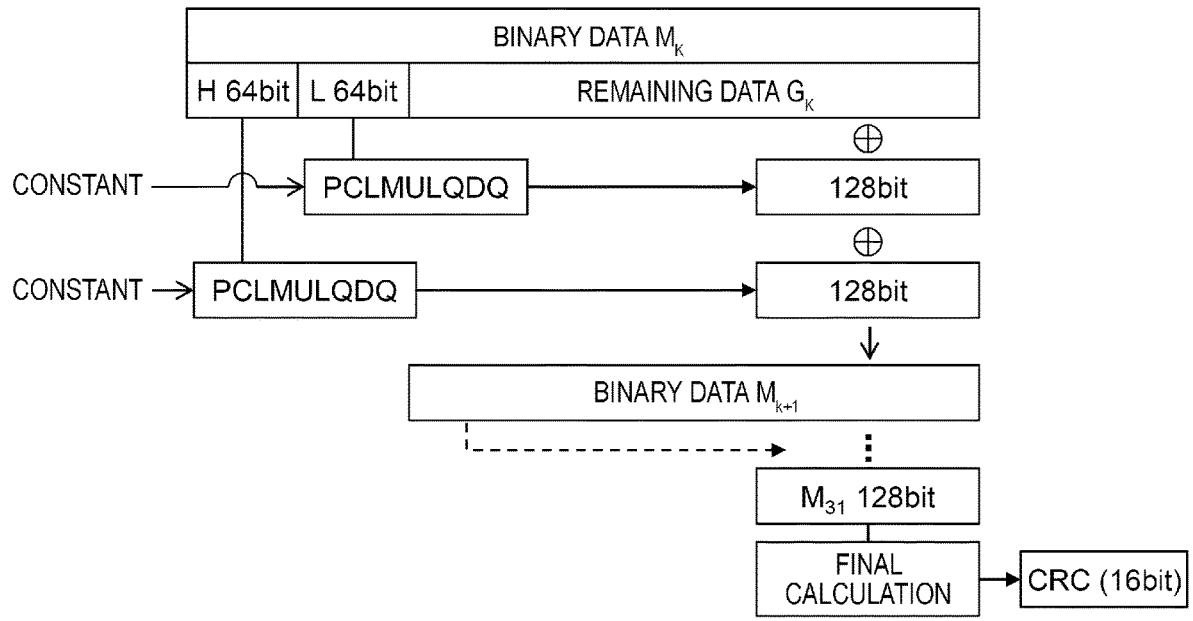
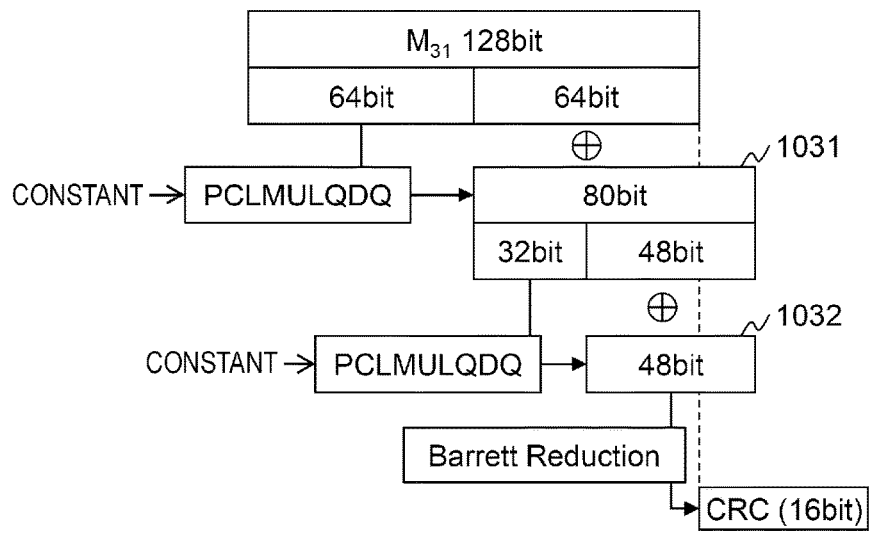

COMPUTER AND DATA PROCESSING METHOD

CLAIM OF PRIORITY

The present application claims priority from Japanese patent application JP 2022-141346 filed on Sep. 6, 2022, the content of which is hereby incorporated by reference into this application.

BACKGROUND OF THE INVENTION

1. Field of the Invention

The present invention relates to a technique for encrypting and decrypting user data.

2. Description of Related Art

There are storage systems that have a function of encrypting and storing user data such that the user data cannot be illegally read out from an internal storage medium. The storage system having the function described above encrypts the user data input from an external host computer and stores the encrypted user data in a storage medium in response to a write command. In addition, the storage system having the function described above decrypts the encrypted user data stored in the storage medium and outputs the user data in response to a read command.

When the storage system does not have hardware that supports data encryption and decryption, a CPU in the storage system executes encryption of the user data associated with write process and decryption of the encrypted user data associated with read process according to a program code including a plurality of CPU instructions. The higher the encryption and decryption performance of the CPU of the storage system, the higher the read/write response of the user data.

Some CPUs support dedicated cryptographic instructions to improve the encryption and decryption performance. An instruction set called AES-NI is an example of the dedicated cryptographic instructions.

U.S. Pat. No. 8,194,854B discloses a technique that the CPU dispatches dedicated cryptographic instructions every cycle so as to perform independent encryption/decryption for different data blocks in parallel, thereby improving encryption/decryption throughput (see FIG. 4, for example).

U.S. Pat. No. 10,320,558B discloses a technique that the CPU applies SIMD instructions (instructions that can perform the same processing on multiple data with one instruction) to the stream encryption process of exclusive ORing plaintext data and a keystream to generate ciphertext data, thereby doubling performance thereof (see TABLE 3).

A storage system is also known, in which, in order to improve reliability as an information processing device in processing the user data received from a host computer, the storage system has a function of adding management information called data integrity field (DIF) to the user data to confirm whether the user data is accidentally destroyed or mistaken for other user data. The storage system having the function described above performs DIF generation, inspection, and the like in write process and read process. When the storage system does not have hardware supporting the DIF generation and inspection, the CPU provided in the storage system executes the DIF generation and inspection according to a program code including a plurality of CPU instructions.

In a storage system having a function of encrypting and storing user data and a function of adding DIF to user data, a detailed method for improving processing performance of user data encryption executed by CPU is not disclosed in the related art.

A representative example of the invention disclosed in the present application is as follows. That is, there is provided a computer that writes and reads user data including a plurality of data blocks, including: a processor, a memory connected to the processor, a storage medium connected to the processor, and a connection interface connected to the processor, in which the processor includes a plurality of registers, and is configured to: receive a request to write the user data; store the user data written in response to the write request in the memory; execute an encryption process of generating encrypted user data including a plurality of encrypted data blocks using the plurality of registers; add a first data integrity field including a first error code to each of the plurality of encrypted data blocks in the encrypted user data; and store the encrypted user data in the storage medium, and the encryption process includes repeatedly executing: a first process of reading partial data that is a part of the data blocks from a predetermined number of the data blocks and storing the partial data in a first register; a second process of storing, in a second register, encrypted partial data obtained by encrypting the partial data stored in the first register; and a third process of executing a first operation for calculating the first error code using the encrypted partial data stored in the second register and storing a result of the first operation in a third register.

According to one aspect of the invention, the processing performance of encryption processing can be improved. Problems, configurations, and effects other than those described above will be clarified by the following description of the embodiments.

SUMMARY OF THE INVENTION

According to one aspect of the invention, it is possible to enhance the encryption performance. Problems, configurations, and effects other than those described above will be apparent from the following description of the embodiments.

BRIEF DESCRIPTION OF THE DRAWINGS

FIG. 2C is a diagram illustrating a format of data handled by the storage system of the first embodiment;

FIG. 3A is a diagram provided to explain WSC specifications of the first embodiment;

FIG. 3B is a diagram provided to explain the WSC specifications of the first embodiment;

FIG. 3C is a diagram provided to explain the WSC specifications of the first embodiment;

FIG. 7A is a diagram provided to explain XTS encryption/decryption in the storage system of the first embodiment;

FIG. 10B is a diagram provided to explain the method for calculating CRC in the storage system of the first embodiment;

FIG. 10C is a diagram provided to explain the method for calculating CRC in the storage system of the first embodiment;

DESCRIPTION OF EMBODIMENTS

Figure 1:
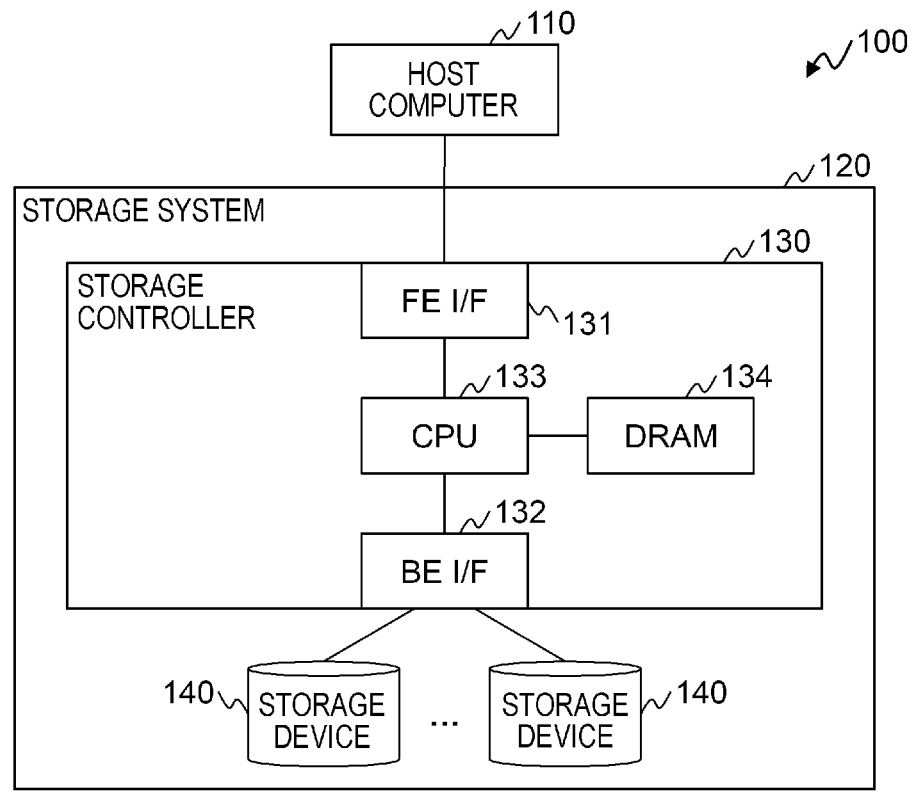
FIG. 1 is a diagram illustrating a configuration example of a computer system of a first embodiment.

An embodiment of the invention will be described with reference to the drawings. Note that the invention is not construed as being limited to the description of the embodiments below. It is easily understood by those skilled in the art that the specific configuration may be changed without departing from the spirit or gist of the invention.

In the configurations of the invention described below, the same or similar configurations or functions are denoted by the same reference numerals, and duplicate descriptions will not be repeated.

Notations such as "first", "second", and "third" in the description and the like are used to identify components, and do not necessarily limit the number or order.

First Embodiment

FIG. 1 is a diagram illustrating a configuration example of a computer system of a first embodiment.

A computer system 100 according to the first embodiment includes a host computer 110 and a storage system 120. The host computer 110 and the storage system 120 are connected to each other directly or via a network.

The storage system 120 is an example of a computer that reads and writes data. The storage system 120 includes a storage controller 130 and storage devices 140. The storage devices 140 are Hard Disk Drives (HDDs) and Solid State Drives (SSDs), for example. The storage devices 140 may be mounted on the storage controller 130.

The storage controller 130 includes one or more front-end interfaces (FE I/F) 131, one or more back-end interfaces (BE I/F) 132, a CPU 133, and a Dynamic Random Access Memory (DRAM) 134. The DRAM 134 is a volatile memory (memory device) that can be read and written in units of bytes.

While FIG. 1 illustrates a single element for each of the hardware elements of the storage system 120, a plurality of elements may be present in order to achieve redundancy, high performance, large capacity, or the like.

The storage controller 130 according to the first embodiment provides the host computer 110 with logical volumes. The following methods are available as the provision methods.

(Provision Method 1) One or a plurality of logical volumes (substantial logical volumes) are formed with a plurality of storage devices 140 and provided to the host computer 110.

(Provision Method 2) The storage controller 130 provides the host computer 110 with a logical volume formed by a thin provisioning technology. The logical volume is a virtual volume, and the actual storage area is dynamically allocated.

The host computer 110 issues an I/O command (write command or read command) designating the provided logical volume and a location within the logical volume (logical block number (or abbreviated as LBA)) to request to write/read the user data to/from the logical volume.

The FE I/F 131 is an interface device for communicating with the host computer 110. The FE I/F 131 has a function of adding information called data integrity field (DIF) to the user data received from the host computer 110. In addition, the FE I/F 131 has a function of inspecting and removing the DIFs added to data to be transmitted to the host computer 110. For example, the DIF is T10-DIF. The T10-DIF is standardized by the American National Standards Institute (ANSI).

The BE I/F 132 is an interface device for communicating with the storage device 140. For example, the BE I/F 132 is SAS, SATA, NVMe, and Fibre Channel.

The CPU 133 includes a plurality of registers used in write process/read process, executes user data write process in response to an I/O command (write command), and executes user data read process in response to an I/O command (read command). In the write process, the user data received from the host computer 110 is encrypted, and the encrypted user data is permanently stored in the storage device 140. In the read process, encrypted user data stored in the storage device 140 is decrypted into the user data and transmitted to the host computer 110. Details of the write/read processes will be described in detail below.

For example, the CPU 133 is a third-generation Xeon (Xeon is a registered trademark, the same applies hereinafter) scalable processor (codename: IceLake-SP), which is a microprocessor developed for servers by Intel (Intel is a registered trademark, the same applies hereinafter).

The DRAM 134 stores programs executed by the CPU 133 and data handled by the programs. In addition, the DRAM 134 includes a cache area. In the cache area, user data input according to an I/O command (write command) received from the host computer 110, encrypted user data written to the storage device 140, encrypted user data read from the storage device 140, and user data output according to an I/O command (read command) received from the host computer 110 are cached.

When the user data input together with the I/O command (write command) is cached in the cache area, the CPU 133 multiplexes the user data and stores the multiplexed data. When corruption of cached user data is detected, the CPU 133 performs write process and the like using the multiplexed user data. This makes it possible to prevent the loss of user data.

In addition, in order to prevent loss of encrypted user data due to a failure of the storage device 140, the storage system 120 implements redundancy based on Redundant Arrays of Independent Disks (RAID) technology and stores the encrypted user data. Specifically, when N (N is an integer equal to or greater than 2) storage devices 140 are mounted, the CPU 133 evenly distributes the data to write to (N−1) and records the same in each storage device 140, and stores the parity generated by the exclusive OR of the data to write in each storage device 140 in one storage device 140. This makes it possible to recover data even when one of the storage devices 140 fails. For example, when N=4, the CPU 133 records data D1, D2, and D3 of the same size in the three storage devices 140, and records a parity P (P=D1+D2+D3: + indicates an exclusive OR) generated by the exclusive OR of the data D1, D2, and D3 in one storage device 140. For example, when the storage device 140 recording D2 fails, the CPU 133 recovers the data D2 by the exclusive OR of the parity P, the data D1, and the data D3.

Figure 2A:
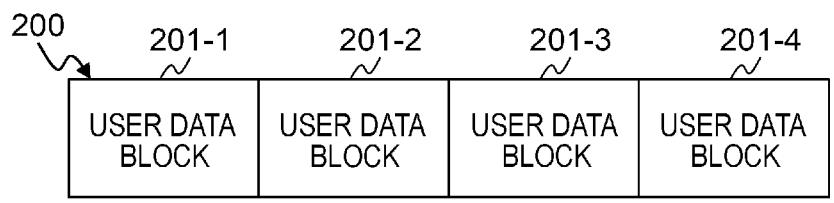
FIG. 2A is a diagram illustrating a format of data handled by a storage system of the first embodiment.
Figure 2B:
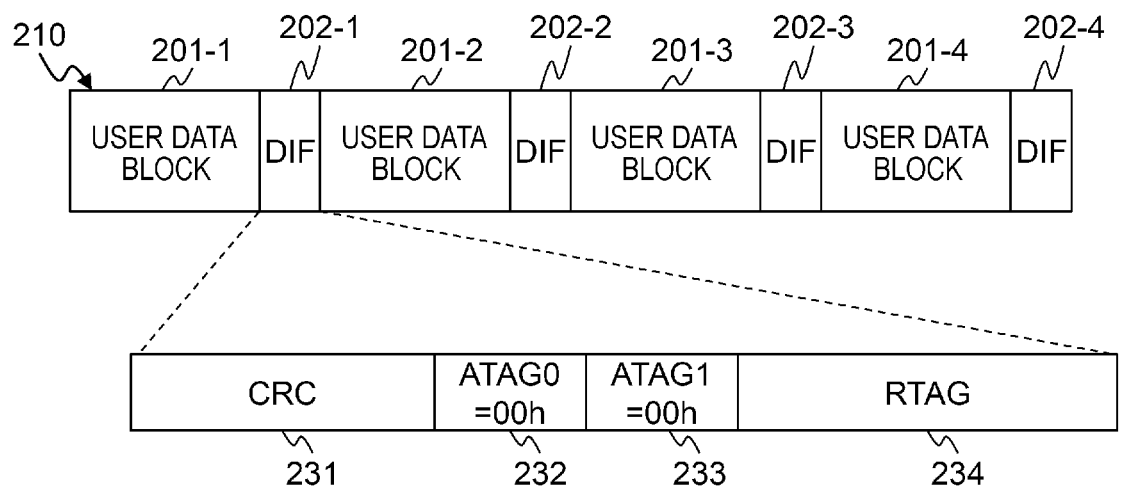
FIG. 2B is a diagram illustrating a format of data handled by the storage system of the first embodiment.

FIGS. 2A, 2B, and 2C are diagrams illustrating formats of data handled by the storage system 120 of the first embodiment.

A data format 200 illustrated in FIG. 2A is an example of the format of the user data transmitted with a write command transmitted from the host computer 110 or user data transmitted from the storage system 120 to the host computer 110 by a read command.

The user data includes one or more user data blocks 201. For example, the size of the user data block 201 is 512 bytes. The user data illustrated in FIG. 2 is data of 2048 bytes including four user data blocks 201-1, 201-2, 201-3, and 201-4. For example, when the host computer 110 writes or reads 8192 bytes of user data, the user data includes 16 user data blocks 201.

A data format 210 illustrated in FIG. 2B is an example of the format of user data that the storage system 120 caches in the DRAM 134.

The FE I/F 131 of the storage system 120 adds a DIF 202 to the end of each user data block 201 in the user data. In FIG. 2B, DIFs 202-1, 202-2, 202-3, and 202-4 are added to the user data blocks 201-1, 201-2, 201-3, and 201-4, respectively.

The DIF 202 conforms to the T10-DIF standard, and includes a 2-byte Cyclic Redundancy Check (CRC) 231, a 2-byte Application Tag (ATAG) (0) 232, a 2-byte ATAG (1) 233, and a 4-byte Reference Tag (RTAG) 234.

The CRC 231 is a 16-bit error detection code calculated from the 512-byte user data block 201 positioned before the DIF 202. A RTAG 234 is an address associated with the 512-byte user data block 201 positioned before the DIF 202. The addresses set in the RTAG 234 are set in ascending order from the user data block 201 at the head of the user data toward the user data block 201 at the end thereof. For example, when the address of the user data block 201-1 is K (K is an integer), the address of user data block 201-2 is K+1, the address of user data block 201-3 is K+2, and the address of user data block 201-4 is K+3. The ATAG(0) 232 and ATAG(1) 233 may be used for any purpose. When the user data is cached in the DRAM 134, since the ATAG(0) 232 and ATAG(1) 233 are not used, the storage system 120 sets each of ATAG(0) 232 and ATAG(1) 233 to 00h.

By adding the DIF 202 to each user data block 201 of the user data stored in the DRAM 134, the storage system 120 can detect the occurrence of errors in write/read process. Specifically, the storage system 120 can detect corruption of the user data block 201 by inspecting the CRC 231. The storage system 120 can inspect the RTAG 234 to detect the order of the user data blocks 201 being changed. The DIF inspection performed when the FE I/F 131 transmits the user data to the host computer 110 is the inspection described above.

A data format 220 illustrated in FIG. 2C is an example of a format of the encrypted user data stored in the storage device 140 by the storage system 120. The encrypted user data illustrated in FIG. 2C includes encrypted user data blocks 203-1, 203-2, 203-3, and 203-4 obtained by encrypting the user data blocks 201-1, 201-2, 201-3, and 201-4.

The storage system 120 encrypts each user data block 201 in the user data into the encrypted user data block 203 using the XTS (XEX encryption mode with Tweak and ciphertext Stealing) mode of an Advanced Encryption Standard (AES) algorithm.

The AES is a common key cryptographic algorithm established by the US National Institute of Standards and Technology (NIST) as a standard cryptography. For example, the size of AES key is 256 bits. However, the size of AES key does not have to be 256 bits. The XTS mode is a block cipher system for storage devices established by the standardization document IEEE1619. In the following description, encryption by the XTS mode of the AES algorithm is referred to as XTS encryption, and decryption by the XTS mode is referred to as XTS decryption.

The storage system 120 adds a DIF 204 to each encrypted user data block 203, like caching of user data.

The DIF 204 complies with the T10-DIF standard like the DIF 202, and includes a 2-byte CRC 241, 2-byte ATAG (0) 242, 2-byte ATAG (1) 243, and 4-byte RTAG 244.

The CRC 241 is the 16-bit error detection code calculated from the 512-byte encrypted user data block 203 positioned before the DIF 204. The RTAG 244 is the address associated with the 512-byte encrypted user data block 203 positioned before the DIF 204. The addresses set in the RTAG 244 are set in ascending order from the encrypted user data block 203 at the head of the encrypted user data toward the encrypted user data block 203 at the end thereof. When storing encrypted user data in the storage device 140, the storage system 120 sets a code called write sequence code (WSC) to ATAG(0) 242. The specifications of the WSC will be described with reference to FIG. 3. Since the ATAG(1) 243 is not used, it is set to 00h.

The storage system 120 can add a DIF 204 to each encrypted user data block 203 of encrypted user data stored in the storage device 140 to detect the occurrence of write or read errors. Specifically, the storage system 120 can inspect the CRC 241 to detect corruption of the read encrypted user data block 203. The storage system 120 can inspect the RTAG 244 to detect an error in the address that instructs the storage device 140 to read. An error in writing the encrypted user data to the storage device 140 can be detected by inspecting the WSC set to ATAG(0) 242.

In the following description, the user data block 201 and the encrypted user data block 203 are referred to as the data blocks when they are not distinguished from each other.

FIGS. 3A, 3B, and 3C are diagrams provided to explain the specifications of the WSC of the first embodiment.

A data format 300 illustrated in FIG. 3A is an example of a WSC data format. The WSC is a 1-byte (8-bit) code stored in ATAGO 242 and includes a 1-bit HEAD flag 301, a 1-bit TAIL flag 302, and a 6-bit sequence number (SQN) 303.

The HEAD flag 301 is a flag that stores a value indicating whether the encrypted user data block 203 to write to the storage device 140 is the head. The TAIL flag 302 is a flag that stores a value indicating whether the encrypted user data block 203 to write to the storage device 140 is the end.

When the encrypted user data block 203 to write to the storage device 140 is the head, the HEAD flag 301 is set to 1, and when the encrypted user data block 203 to write to the storage device 140 is the end, the TAIL flag 302 is set to 1. The HEAD flag 301 and the TAIL flag 302 of the encrypted user data block 203 that do not correspond to either the head or the end are set to 0. When writing the encrypted user data including one encrypted user data block 203, the HEAD flag 301 and the TAIL flag 302 are set to 1.

An SQN 303 stores a generation number of the encrypted user data to write to the storage device 140. For the generation number, a different value is used each time it is written.

FIG. 3B illustrates an example of WSC settings when writing the encrypted user data block 203 to addresses 0 to 9 of the storage device 140.

In state 1, encrypted user data including ten encrypted user data blocks 203 are written. In this example, it is assumed that 0x0A is specified as the SQN.

Since the encrypted user data block 203 written to the address 0 is the head, the HEAD 301 is 1 and the WSC is 0x8A. Since the encrypted user data block 203 written to the address 9 is the end, the TAIL 302 is 1 and the WSC is 0x4A. The WSC of the encrypted user data block 203 written to another address is 0x0A.

In state 2, encrypted user data including five encrypted user data blocks 203 are written to the addresses 3 to 7. In this example, it is assumed that 0x0B is specified as the SQN.

The WSC is updated because data is overwritten for five addresses. Since the encrypted user data block 203 written to the address 3 is the head, the HEAD 301 is 1 and the WSC is 0x8B. Since an encrypted user data block 230 written to the address 7 is the end, the TAIL 302 is 1 and the WSC is 0x4B. The WSC of the encrypted user data block 203 written to the addresses 4 to 6 is 0x0B.

A table 320 illustrated in FIG. 3C illustrates an example of rules for inspecting the presence or absence of write errors based on the WSC. When writing the encrypted user data to the storage device 140, the storage system 120 reads the WSC and inspects the presence or absence of write errors according to the rules illustrated in Table 320.

In the table 320, the following rules are defined.

(R1) When the HEAD/TAIL of the WSC of its own block is 1/0 or 1/1, no inspection is performed.

(R2) When the HEAD/TAIL of the WSC of the own block is 0/0 or 0/1 and the HEAD/TAIL of the WSC of the previous block is 0/1, no inspection is performed.

(R3) When the HEAD/TAIL of the WSC of the own block is 0/0 or 0/1 and the HEAD/TAIL of the WSC of the previous block is 0/0, the storage system 120 inspects whether the SQN of the WSC of the own block matches the SQN of the WSC of the previous block.

(R4) When the HEAD/TAIL of the WSC of the own block is 0/0 or 0/1 and the HEAD/TAIL of the WSC of the previous block is 1/0, the storage system 120 inspects whether the SQN of the WSC of the own block matches the SQN of the WSC of the previous block.

(R5) When the HEAD/TAIL of the WSC of the own block is 0/0 or 0/1 and the HEAD/TAIL of the WSC of the previous block is 1/1, no inspection is performed.

(R3) and (R4) indicate inspecting whether the SQNs of the encrypted user data block 203 match, when the own block is not at the head and the previous block is not at the end. As a result, it is possible to confirm whether writing the user data including a plurality of blocks is successful without interruption. For example, since the WSCs of addresses included in rectangles 311, 312, and 313 in FIG. 3B match the conditions (R3) and (R4), the WSCs of addresses are subject to inspection. In writing five blocks to addresses 3 to 7, when the writing to address 5 fails, the WSC of address 5 remains 0x0A without being updated. This error can be detected when the SQN (0x0A) for address 5 does not match the SQN (0x0B) at address 4 in the inspection of the WSC at address 5. In writing five blocks to addresses 3 to 7, when the writing to address 3 fails, the WSC of address 3 remains 0x0A without being updated. This error can be detected when the SQN (0x0B) does not match the SQN (0x0A) at address 3 in the inspection of the WSC at address 4.

(R1), (R2), and (R5) indicate that, when one's own block is the head, or the previous block is the end, the SQN of the WSC of the own block and the SQN of the WSC of the previous block do not need to match, so no inspection is performed.

Figure 4:
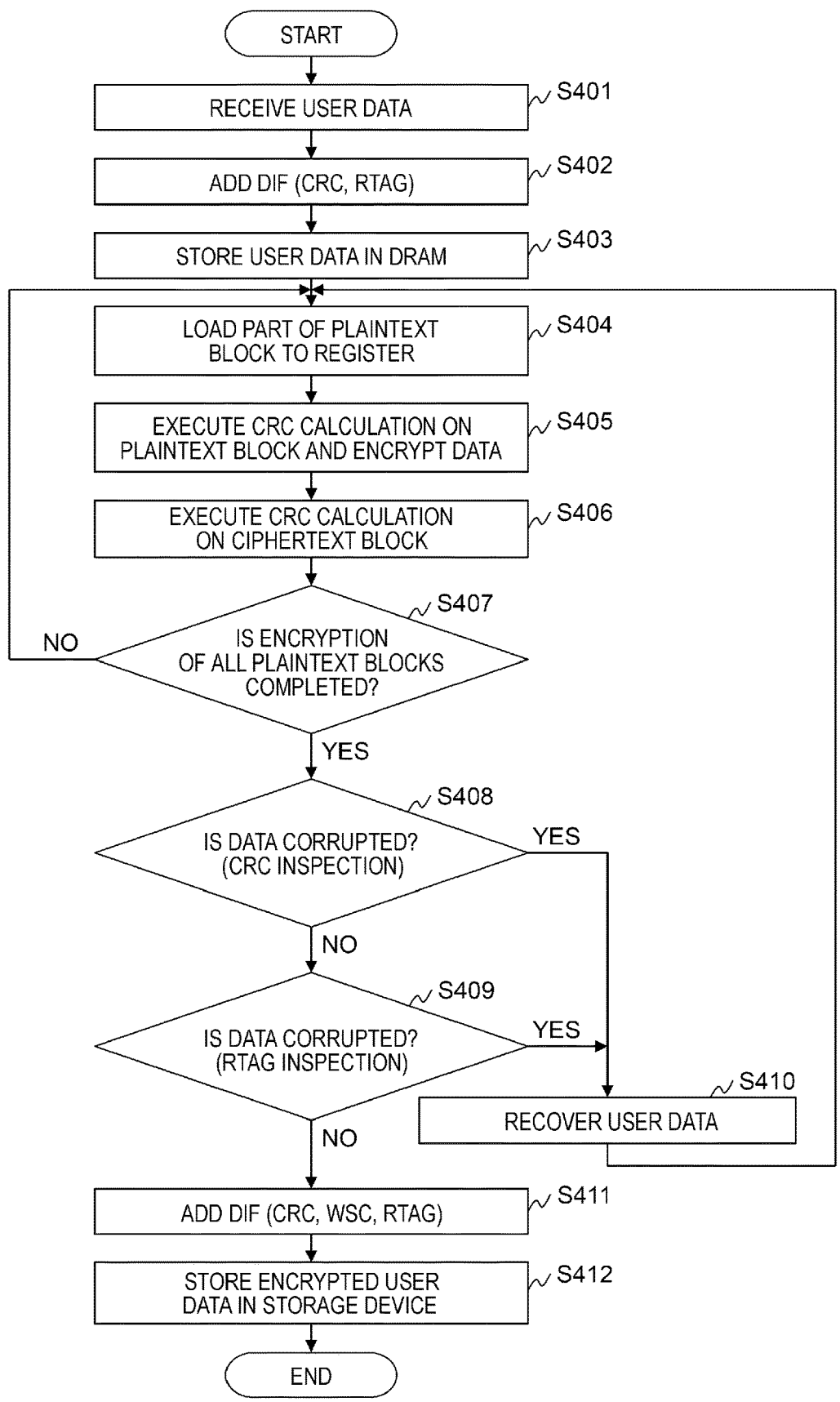
FIG. 4 is a flowchart provided to explain an example of write process executed by the storage system of the first embodiment.

FIG. 4 is a flowchart provided to explain an example of write process executed by the storage system 120 of the first embodiment. In the following description, a user data block 201 not subject to XTS encryption is called a plaintext block, and a user data block 203 encrypted by XTS encryption is called a ciphertext block.

The storage system 120 receives user data together with a write command from the host computer 110 (step S401).

The storage system 120 adds the DIF 202 to the plaintext blocks forming the user data (step S402). Specifically, the FE I/F 131 calculates the 16-bit error detection code from the plaintext block and sets it as the CRC 231, and sets the block address as the RTAG 234.

The CPU 133 of the storage system 120 stores the user data added with the DIF 202 in the DRAM 134 (step S403). At this time, the storage system 120 multiplexes the user data and stores it in the DRAM 134 in order to prevent user data loss.

The CPU 133 of the storage system 120 reads a part of the plaintext block from the DRAM 134 and loads it into the register (step S404).

The CPU 133 of the storage system 120 uses the data loaded in the register to execute an operation (CRC calculation) for calculating the CRC of the plaintext block, and encrypts the data by XTS encryption (step S405). As a result, a part of the ciphertext block is generated. The encrypted data is stored in the register and also in the DRAM 134.

The CPU 133 of the storage system 120 uses the encrypted data stored in the register to execute CRC calculation for calculating the CRC of the ciphertext block (step S406).

The CPU 133 of the storage system 120 determines whether encryption of all plaintext blocks is completed (step S407).

When encryption of all plaintext blocks is not completed, the CPU 133 of the storage system 120 returns to step S404 and executes the same processing. In this way, the storage system 120 sequentially moves the load source point from the head to the end of the plaintext block and sequentially encrypts the data.

When encryption of all plaintext blocks is completed, the CRC of each plaintext block and ciphertext block is calculated, and the encrypted user data is generated.

The CPU 133 of the storage system 120 determines whether the user data is corrupted, by comparing the calculated CRC of the plaintext block with the CRC 231 included in the DIF 202 (step S408). Specifically, it is determined whether the CRCs match with each other. When at least one CRC does not match with each other, it is determined that the user data is corrupted.

When corruption of the user data is detected by the CRC inspection, the CPU 133 of the storage system 120 recovers the user data using the multiplexed user data (step S410), and then returns to step S404.

When corruption of the user data is not detected by the CRC inspection, the CPU 133 of the storage system 120 determines whether the user data is corrupt based on the RTAG 234 included in the DIF 202 (step S409). Specifically, it is determined whether the addresses are in ascending order. When the addresses are not in ascending order, it is determined that the user data is corrupted.

When corruption of the user data is detected by the RTAG 234 inspection, the CPU 133 of the storage system 120 recovers the user data using the multiplexed user data (step S410), and then returns to step S404.

When corruption of the user data is not detected by the inspection of the RTAG 234, the CPU 133 of the storage system 120 adds the DIF 204 to each ciphertext block (step S411). Specifically, the 16-bit error detection code calculated from the ciphertext block is set in the CRC 241, the WSC described with reference to FIG. 3 is set in the ATAGO 242, and the address of the ciphertext block is set in the RTAG 234.

The CPU 133 of the storage system 120 writes the encrypted user data with the DIF 204 added to the storage device 140 (step S412). At this time, the CPU 133 writes the encrypted user data divided into N−1 equal parts and the parity generated by RAID technology to the plurality of storage devices 140. The write process has been described above.

Figure 5:
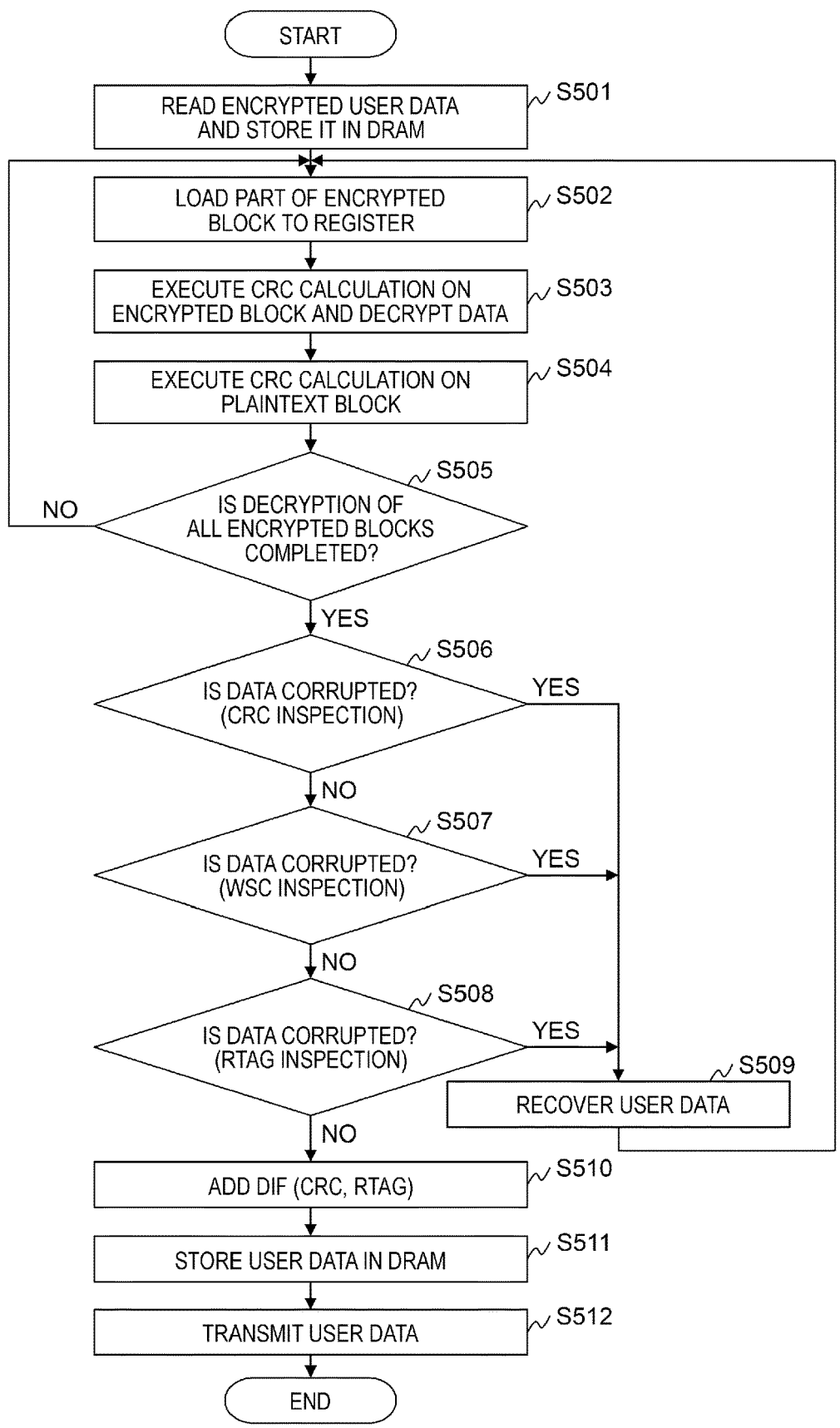
FIG. 5 is a flowchart provided to explain an example of read process executed by the storage system of the first embodiment.

FIG. 5 is a flowchart provided to explain an example of read process executed by the storage system 120 of the first embodiment.

When receiving a read command from the host computer 110, the CPU 133 of the storage system 120 reads the encrypted user data with the DIF 204 added from the storage device 140 and stores it in the DRAM 134 (step S501).

The CPU 133 of the storage system 120 loads a part of the ciphertext block from the DRAM 134 into the register (step S502).

The CPU 133 of the storage system 120 uses the data loaded in the register to execute an operation (CRC calculation) for calculating the CRC of the ciphertext block, and decrypts the data by XTS decryption (step S503). As a result, a part of the plaintext block is generated. The decrypted data is stored in registers and also in the DRAM 134.

The CPU 133 of the storage system 120 uses the decrypted data stored in the register to execute an operation (CRC calculation) for calculating the CRC of the plaintext block (step S504).

The CPU 133 of the storage system 120 determines whether the decryption of all ciphertext blocks is completed (step S505).

When the decryption of all ciphertext blocks is not completed, the CPU 133 of the storage system 120 returns to step S502 and executes the same processing. In this way, the load source point sequentially moves from the head to the end of the ciphertext block, and the data is sequentially decrypted.

When decryption of all ciphertext blocks is completed, the CRCs of the ciphertext blocks and the plaintext blocks are calculated, and user data is generated.

The CPU 133 of the storage system 120 determines whether the encrypted user data is corrupted, by comparing the calculated CRC of the ciphertext block with the CRC 241 included in the DIF 204 (step S506). That is, it is determined whether reading or writing of encrypted user data fails. Specifically, it is determined whether the CRCs match with each other. When at least one CRC does not match with each other, it is determined that the encrypted user data is corrupted.

When corruption of the encrypted user data is detected by the CRC inspection, the CPU 133 of the storage system 120 reads the parity from the storage system 120 to recover the encrypted user data (step S509), and then returns to step S502.

When corruption of the encrypted user data is not detected by the CRC inspection, the CPU 133 of the storage system 120 determines whether the encrypted user data is corrupted based on the WSC included in the DIF 204 (step S507). That is, it is determined whether reading or writing of encrypted user data fails. Specifically, inspection is performed according to the table 320 illustrated in FIG. 3C.

When corruption of the encrypted user data is detected by the WSC inspection, the CPU 133 of the storage system 120 reads the parity from the storage system 120 to recover the encrypted user data (step S509), and then returns to step S502.

When corruption of the encrypted user data is not detected by the WSC inspection, the CPU 133 of the storage system 120 determines whether the encrypted user data is corrupted based on the RTAG 234 included in DIF 204 (step S508). That is, it is determined whether reading or writing of encrypted user data fails. Specifically, it is determined whether the addresses are in ascending order. When the addresses are not in ascending order, it is determined that the encrypted user data is corrupted.

When corruption of the encrypted user data is detected by the RTAG 234 inspection, the CPU 133 of the storage system 120 reads the parity from the storage system 120 to recover the encrypted user data (step S509), and then returns to step S502.

When corruption of the user data is not detected by the inspection of the RTAG 234, the CPU 133 of the storage system 120 adds the DIF 202 to each plaintext block (step S510). Specifically, the 16-bit error detection code calculated from the plaintext block is set in the CRC 231 and the address of the plaintext block is set in the RTAG 234.

The CPU 133 of the storage system 120 stores the user data added with the DIF 202 in the DRAM 134 (step S511).

The storage system 120 transmits the user data to the host computer 110 (step S512). At this time, the FE I/F 131 inspects the DIF and removes the DIF from the user data. The read process has been described above.

Figure 6A:
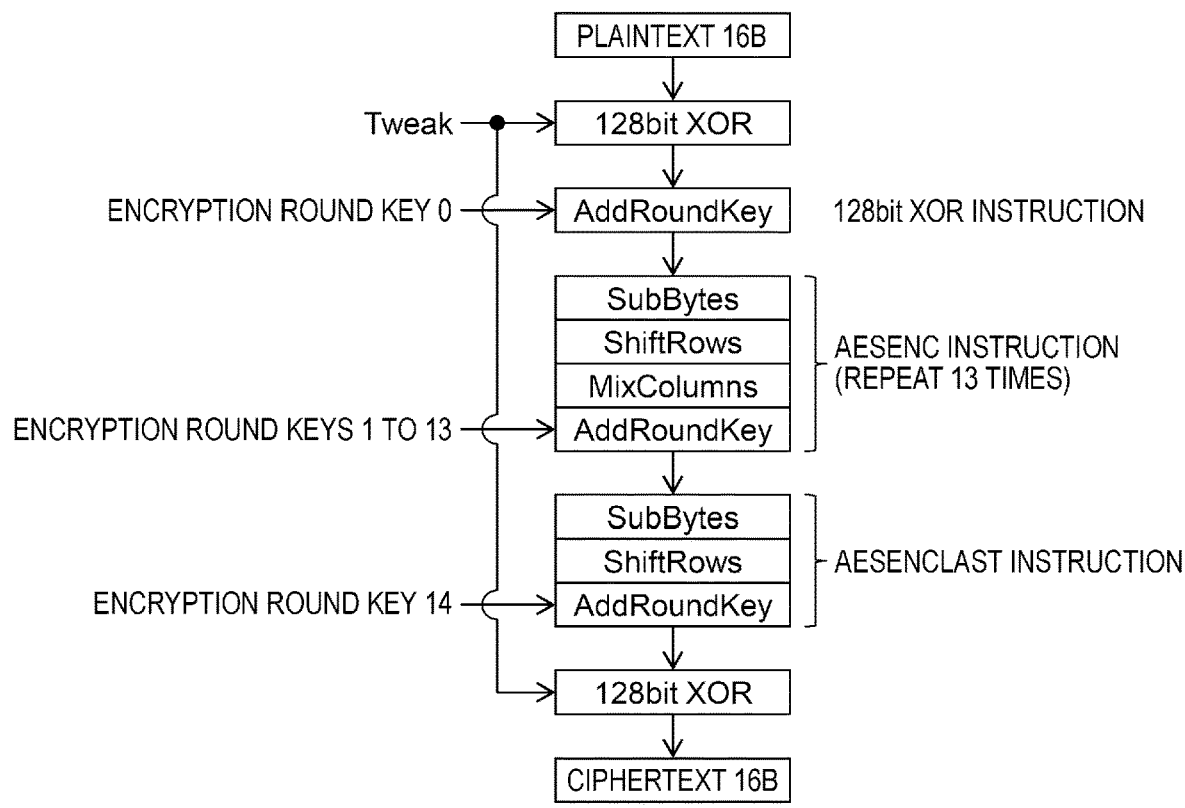
FIG. 6A is a diagram provided to explain related XTS encryption/decryption.
Figure 6B:
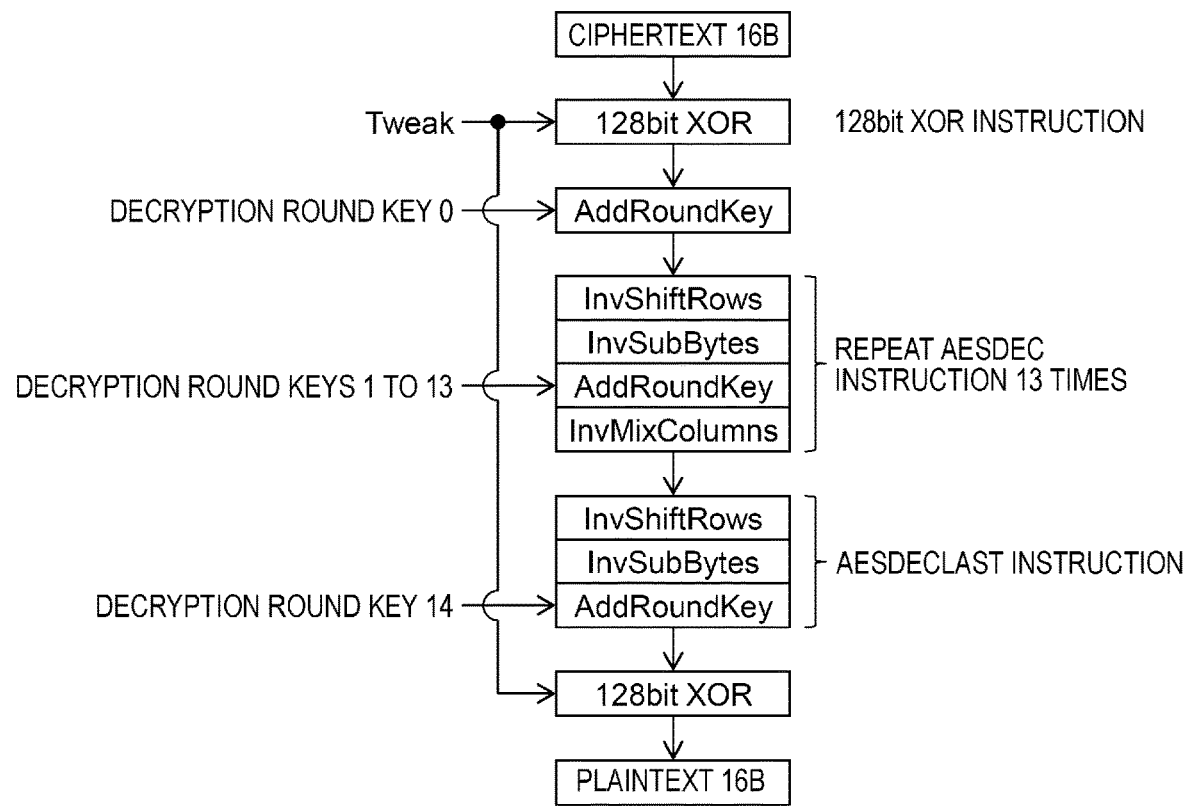
FIG. 6B is a diagram provided to explain the related XTS encryption/decryption.

FIGS. 6A and 6B are diagrams provided to explain related XTS encryption/decryption.

FIG. 6A illustrates the processing procedure of the XTS encryption. In the XTS encryption, a 512-byte plaintext block is encrypted by 16 bytes. First (E1), an exclusive OR between a 16-byte Tweak and a part of the plaintext block is calculated. Next (E2), the encryption based on the AES encryption algorithm is performed. Finally (E3), an exclusive OR between the result of encryption and the Tweak is calculated to generate a 16-byte ciphertext element. The cycle of processing (E1), (E2), and (E3) is executed 32 times to generate a ciphertext block of 512 bytes.

Tweak is changed every time 16 bytes of data are encrypted. In addition, Tweak is a different value for each 512-byte block.

In the AES algorithm of (E2), encryption is performed using 15 encryption round keys (128 bits). These round keys are generated by subjecting a 256-bit encryption key to a defined expansion processing (Key Expansion). First (E2-1), AddRoundKey processing is executed, then (E2-2), four processes of SubBytes, ShiftRows, MixColumns, and AddRoundKey are repeated 13 times, and finally (E2-3), three processes of SubBytes, ShiftRows, and AddRoundKey are executed. The AddRoundKey processing, which is executed 15 times, uses encryption round keys 0 to 14.

Each of the processes described above can correspond to the following CPU instructions. The exclusive OR of data and Tweak corresponds to the XOR instruction. AddRoundKey processing, as a CPU instruction, corresponds to the exclusive OR (XOR) of the processing result of the previous stage and the encryption round key. The four processes of (E2-2) correspond to the AESENC instruction. That is, the AESENC instruction needs to be executed 13 times. The three processes of (E2-3) correspond to the AESENCLAST instruction. The AESENC instruction and the AESENCLAST instruction are implemented as a part of a dedicated cryptographic instruction set called AES New Instructions (AES-NI) in microprocessors produced by Intel since around 2010.

FIG. 6B illustrates the processing procedure of the XTS decryption. In XTS decryption, a ciphertext block of 512 bytes is decrypted by 16 bytes. First (D1), an exclusive OR between the 16-byte Tweak and a part of the encrypted block is calculated. Next (D2), the decryption based on the AES algorithm is performed. Finally (D3), an exclusive OR between the result of decryption and the Tweak is calculated to generate a 16-byte plaintext element. A 512-byte plaintext block is generated by executing (D1), (D2), and (D3) 32 times.

Tweak is changed each time 16-byte data is decrypted. In addition, Tweak is a different value for each 512-byte block.

In the AES decryption algorithm (D2), decryption is performed using 15 decryption round keys (128 bits). These round keys are generated by subjecting a 256-bit encryption key to a defined expansion processing (Key Expansion). The 256-bit encryption key is the same as the encryption key used for encryption. First (D2-1), AddRoundKey processing is executed, next (D2-2), four processes of InvShiftRows, InvSubBytes, AddRoundKey, and InvMixColumns are repeated 13 times, and finally (D2-3), three processes of InvShiftRows, InvSubBytes, and AddRoundKey are executed. The AddRoundKey processing, which is executed 15 times, uses decryption round keys 0 to 14.

Each of the processes described above can correspond to the following CPU instructions. The exclusive OR of data and Tweak corresponds to the XOR instruction. The AddRoundKey processing corresponds to the exclusive OR (XOR) of the processing result of the previous stage and the decryption round key. The four processes of (D2-2) correspond to the AESDEC instruction. That is, the AESDEC instruction needs to be executed 13 times. The three processes of (D2-3) correspond to the AESDECLAST instruction. The AESDEC and AESDECLAST instructions are implemented as a part of AES-NI as described above.

Figure 7B:
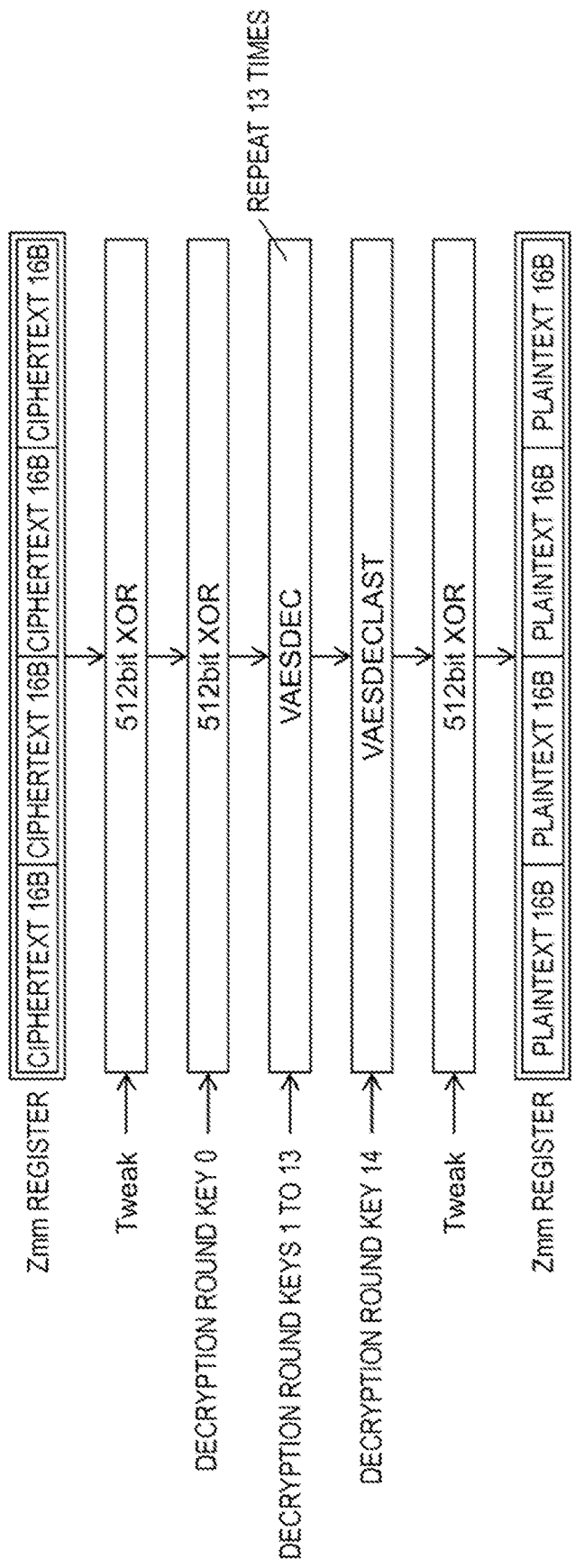
FIG. 7B is a diagram provided to explain the XTS encryption/decryption in the storage system of the first embodiment.
Figure 7C:
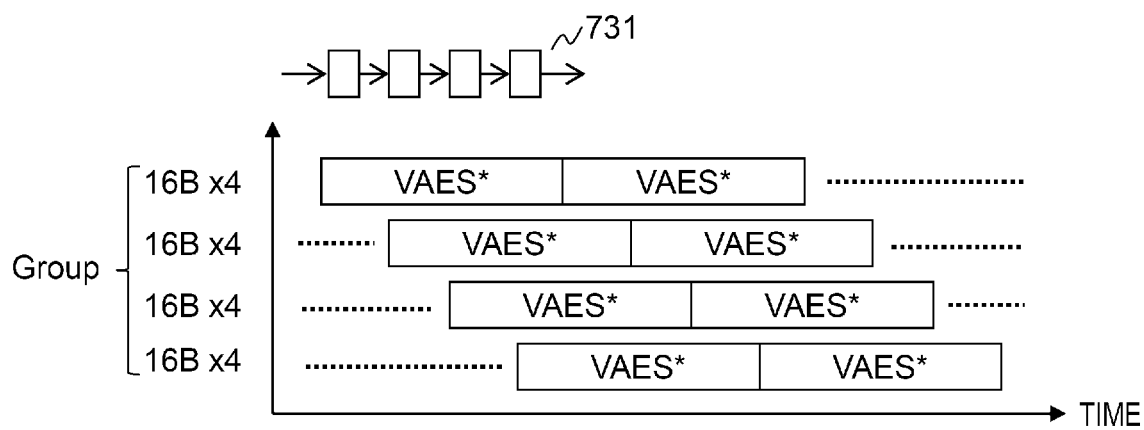
FIG. 7C is a diagram provided to explain the XTS encryption/decryption in the storage system of the first embodiment.

FIGS. 7A, 7B, and 7C are diagrams provided to explain the XTS encryption/decryption in the storage system 120 of the first embodiment.

The CPU 133 is a third-generation Xeon scalable processor or the like and supports AES-NI, and among these, also supports vectorized instructions (VAESENC instruction, VAESENCLAST instruction, VAESDEC instruction, and VAESDECLAST instruction) of the AESENC instruction, AESENCLAST instruction, AESDEC instruction, and AESDECLAST instruction.

A Vector instruction is an instruction that can perform the same operation on multiple data in parallel in one execution. It is also called a Single Instruction/Multiple Data (SIMD) instruction. The Vector instruction uses a 512-bit (64-byte) register called a Zmm register to execute the same operation on four pieces of 128-bit (16-byte) data. The operation result is also stored in the Zmm register. The CPU 133 uses 32 Zmm registers (Zmm0 to Zmm31 registers). The CPU 133 also supports vectorized instructions for instructions that perform general operations (addition, subtraction, multiplication, exclusive OR, shift, comparison, and the like) for microprocessors.

The CPU 133 executes XTS encryption/decryption in parallel using these Vector instructions. Specifically, four data blocks (512 bytes) are encrypted/decrypted in parallel.

FIG. 7A illustrates parallel XTS encryption of four plaintext blocks by the CPU 133.

The CPU 133 loads 16 bytes of data from each of the four plaintext blocks (512 bytes) stored in the DRAM 134 into the Zmm register. A total of 64 bytes of data are stored in the Zmm register.

The CPU 133 executes the (P1) Vector XOR instruction to calculate the exclusive OR of the data stored in the Zmm register and the value obtained by arranging the four Tweaks of each plaintext block. Next, the CPU 133 executes (P2) Vector XOR instruction, the VAESENC instruction 13 times, and the VAESENCLAST instruction to perform XTS encryption of the four plaintext blocks in parallel. Finally, the CPU 133 calculates the exclusive OR of the operation result of (P3) and (P2) and the value obtained by arranging the four Tweaks. As a result, four 16-byte ciphertext elements are generated simultaneously.

The ciphertext elements are stored in the DRAM 134 sequentially from the Zmm register. The cycle of processing (P1), (P2), and (P3) is executed multiple times to generate four ciphertext blocks (512 bytes). In addition, the encryption round keys 0 to 14 used in (P2) are common to each plaintext block.

FIG. 7B illustrates parallel XTS decryption of four ciphertext blocks by the CPU 133.

The CPU 133 loads 16 bytes of data from each of the four ciphertext blocks (512 bytes) stored in the DRAM 134 into the Zmm register. A total of 64 bytes of data are stored in the Zmm register.

The CPU 133 executes the (P4) Vector XOR instruction to calculate the exclusive OR of the data stored in the Zmm register and the value obtained by arranging the four Tweaks of each ciphertext block. Next, the CPU 133 executes (P5) Vector XOR instruction, the VAESDEC instruction 13 times, and the VAESDECLAST instruction to perform XTS decryption of the four ciphertext blocks in parallel. Finally, the CPU 133 calculates the exclusive OR of the operation result of (P6) and (P5) and the value obtained by arranging the four Tweaks. As a result, four 16-byte plaintext elements are generated simultaneously.

The plaintext elements are stored in the DRAM 134 sequentially from the Zmm register. The cycle of processing (P4), (P5), and (P6) is executed multiple times to generate four plaintext blocks (512 bytes). In addition, the decryption round keys 0 to 14 used in (P5) are common to each ciphertext block.

FIG. 7C illustrates a method for optimizing the execution order of the four vectorized AES instructions described above.

In FIG. 7C, VAES*is replaced by VAESENC, VAESENCLAST, VAESDEC, and VAESDECLAST.

Operation circuits used for these instructions each have a four-stage pipeline structure 731, and the number of cycles until completion of processing is four. In the pipeline circuit, when the data shifts from the N-th stage to the (N+1)-th stage, the N-th stage can accept the next data. Therefore, when four VAES* instructions are executed in parallel, data can be continuously supplied to the pipeline in four cycles, thereby improving processing efficiency. Based on this idea, in the encryption illustrated in FIG. 7A and the decryption illustrated in FIG. 7B, when loading 16 bytes from each of the four data blocks into the Zmm registers, the CPU 133 secures four Zmm registers and loads 16 bytes×4 four times in advance. Then, the CPU 133 continuously executes the four VAES* instructions for the four Zmm registers to improve efficiency of pipeline processing. An integration of data processed by four consecutive VAES* instructions is hereinafter referred to as a Group.

Figure 8:
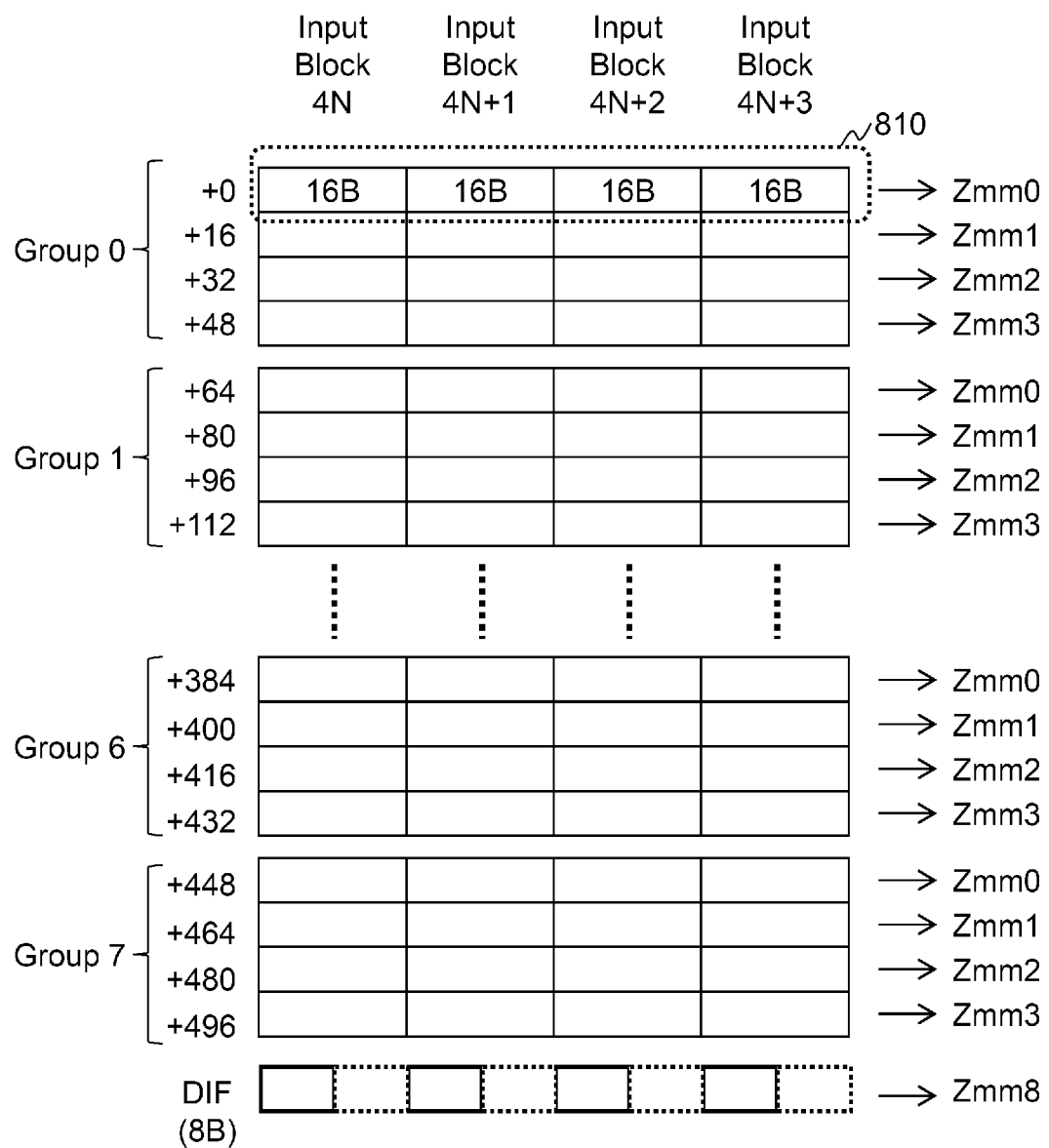
FIG. 8 is a diagram illustrating a structure of input data in XTS encryption/decryption using Vector instructions executed by the storage system of the first embodiment.

FIG. 8 is a diagram illustrating a structure of input data in XTS encryption/decryption using Vector instructions executed by the storage system 120 of the first embodiment.

In the parallel execution of XTS encryption/decryption of four data blocks, Groups illustrated in FIG. 7C include eight Groups 0-7. That is, the procedure of "executing 4 VAES* instructions in succession for four Zmm registers" is executed eight times in one execution of parallel processing of XTS encryption/decryption of four data blocks.

Four 64-byte data (16 bytes×4) forming one Group are loaded into the Zmm0 to Zmm3 registers, respectively. For example, the data loaded into the Zmm0 register is the 64 bytes of data enclosed by dashed line 810. Note that the Zmm register numbers of the load destination are examples, and other register numbers may be used.

An 8-byte DIF is added to the end of each data block of the user data or encrypted user data stored in the DRAM 134. Since inspecting the DIFs of the four data blocks is executed in parallel, the DIFs are loaded into one Zmm register. In FIG. 8, a Zmm8 register is loaded with DIFs added to four data blocks.

The Zmm register can hold four 16-byte data. However, since the DIF is 8 bytes, it is loaded into the Zmm registers at 8-byte intervals. Note that the Zmm register numbers where the DIF is loaded are examples, and other register numbers may be used.

The addresses of the four data blocks simultaneously input to the XTS encryption/decryption process are consecutive in ascending order and are 4N, 4N+1, 4N+2, and 4N+3 (where N is an integer). For example, when the size of user data to write/read is 128 Kbytes (256 blocks), it is necessary that parallel processing of XTS encryption/decryption of four data blocks is performed 64 times.

Figure 9:
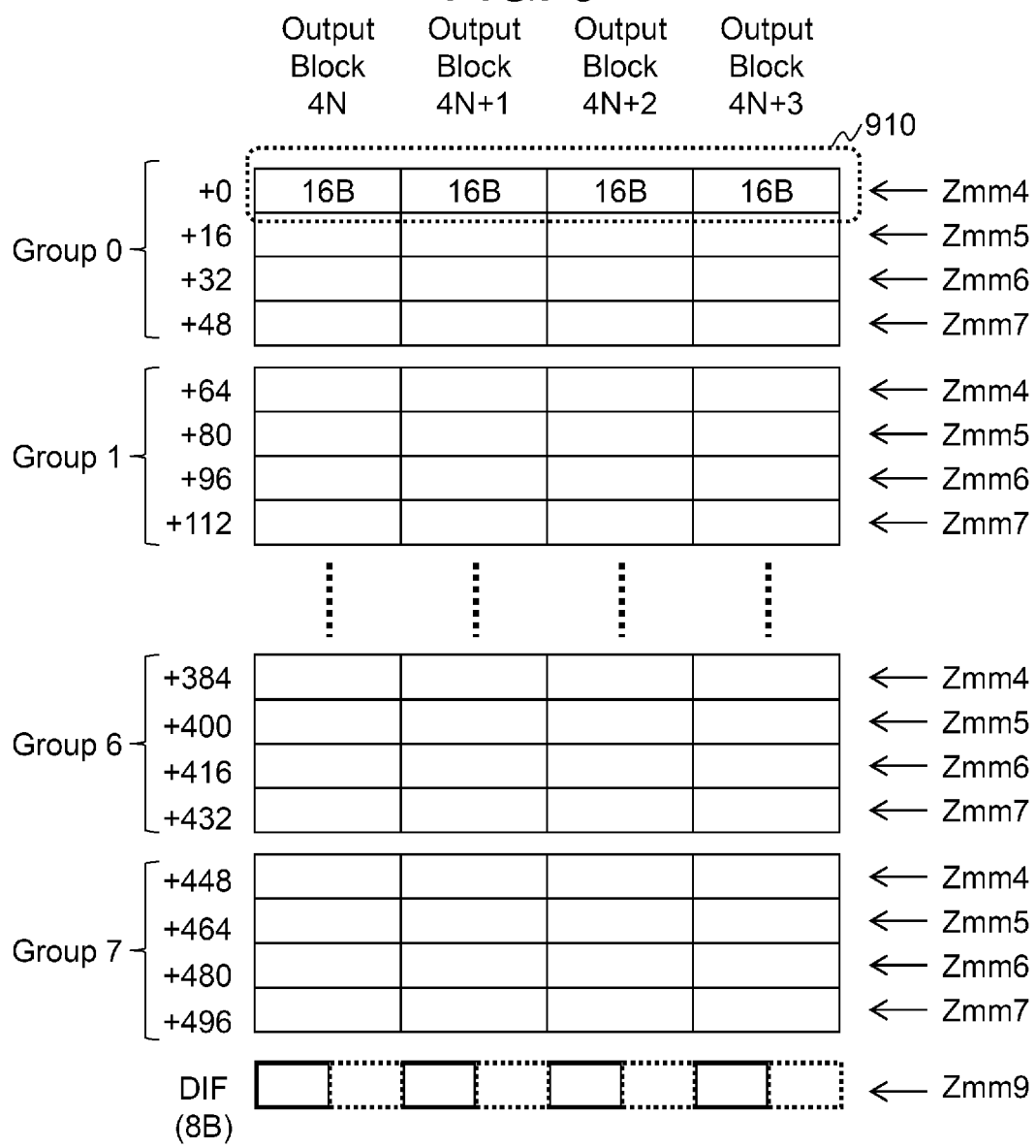
FIG. 9 is a diagram illustrating a structure of output data in XTS encryption/decryption using Vector instructions executed by the storage system of the first embodiment.

FIG. 9 is a diagram illustrating a structure of output data in XTS encryption/decryption using Vector instructions executed by the storage system 120 of the first embodiment.

Groups 0 to 7 in FIG. 9 correspond to output positions at which the result of XTS encryption/decryption of the data of Groups 0 to 7 in FIG. 8 is stored in the DRAM 134. The positional relationship of the output destination of the result of the XTS encryption/decryption is the same as that of the input source. That is, when the input block head position is X and the output block head position is Y, the result of XTS encryption/decryption of the data at position X+P, which is P (P is 0 or more) away from the input block head, is output at position Y+P.

The results of XTS encryption/decryption of one Group are held in four registers Zmm4 to Zmm7, and four 64-byte data (16 bytes×4) are stored at locations according to this rule. For example, the 64 bytes of data enclosed by dashed line 910 are the result of the XTS encryption/decryption of the 64 bytes of data enclosed by dashed line 810 in FIG. 8 and stored in the Zmm4 register. Note that the Zmm register numbers of the storage source are examples, and other register numbers may be used.

An 8-byte DIF is stored in the end of each data block of the user data or encrypted user data stored in the DRAM 134. The DIF generation for the four blocks is executed in parallel, so the DIF is read from one Zmm register. In FIG. 9, DIF is read from Zmm9.

The DIFs stored in Zmm9 register are stored at 8-byte intervals. Note that the Zmm register numbers where the DIF is stored are examples, and other register numbers may be used.

The addresses of the four data blocks to which the results of the XTS encryption/decryption process are output at the same time are consecutive in ascending order as in FIG. 8 and are 4N, 4N+1, 4N+2, and 4N+3 (where N is an integer).

The parallel processing of XTS encryption/decryption of four data blocks described above with reference to FIGS. 7 to 9 is applied in step S405 of FIG. 4 and step S503 of FIG. 5.

Figure 10A:
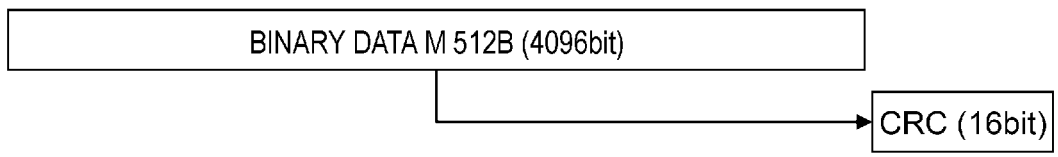
FIG. 10A is a diagram provided to explain a method for calculating CRC in the storage system of the first embodiment.

FIGS. 10A, 10B, and 10C are diagrams provided to explain the method for calculating CRC in the storage system 120 of the first embodiment.

First, the theory of CRC calculation will be explained with reference to FIG. 10A. In general, the CRC of arbitrary length binary data M corresponding to binary polynomial M(x) is defined by Equation (1).

[Equation 1]

$$\mathrm{CRC}(M(x)) = x^{deg(P(x))} \cdot M(x) \bmod P(x) \quad (1)$$

Where, deg represents the degree of the polynomial, P(x) represents the polynomial defining the CRC algorithm, and symbol "·" represents carryless multiplication. For a 16-bit CRC algorithm, P(x) is a polynomial of degree 16. The CRC can be calculated as a remainder polynomial when dividing a large degree polynomial M(x) defined over the Galois field GF(2) by the CRC polynomial P(x).

FIG. 10A illustrates a method for calculating a 16-bit CRC from a typical 512-byte (4096-bit) block in the storage system 120. Binary polynomial division can be executed efficiently when there is a CPU instruction that can perform carryless multiplication efficiently.

FIGS. 10B and 10C illustrate a method of CRC calculation using the PCLMULQDQ instruction capable of executing carryless multiplication up to 64 bits by 64 bits. The PCLMULQDQ instruction is installed in microprocessors produced by Intel since around 2010.

FIG. 10B illustrates a method of shortening the CRC calculation for 512 bytes (4096 bits) of binary data to the CRC calculation for 128 bits of binary data. One shortening process reduces the number of bits of binary data by 128. The relationship between the binary polynomial Mk(x) after performing the shortening process k times and the polynomial Mk+1(x) obtained by performing the shortening process once more is given by Equation (2).

[Equation 2]

$$M_k(x) \bmod P(x) = \{H(x) \cdot [x^{(T+64)} \bmod P(x)]\} + \{L(x) \cdot [x^T \bmod P(x)]\} + G(x) \bmod P(x) \\ = M_{k+1}(x) \bmod P(x) \qquad (2)$$

Where M0(x)=M(x). H(x) represents a polynomial including the upper 64 bits of binary data indicated by Mk(x), and L(x) represents a polynomial including 64 bits following the upper 64 bits of binary data indicated by Mk(x). Gk(x) represents a polynomial including remaining data excluding the upper 128 bits of the binary data indicated by Mk(x). T represents the number of bits of the remaining data. The symbol "+" represents a bitwise exclusive OR.

The PCLMULQDQ instruction multiplies the 64-bit values indicated by H(x) and L(x) by constants to obtain two 128-bit values, and calculates the exclusive OR between these and the remaining data indicated by Gk(x), so that the number of bits of binary data to be subjected to CRC calculation can be reduced by 128. By performing this shortening process 31 times, the CRC calculation of binary data of 512 bytes (4096 bits) results in the CRC calculation of binary data of 128 bits indicated by M31 (x).

FIG. 10C illustrates a method of performing CRC calculation (final calculation in FIG. 10B) of 128-bit binary data indicated by M31(x).

First, in response to the PCLMULQDQ instruction, the CPU 133 multiplies the upper 64-bit value by a constant to obtain an 80-bit value (1031), and calculates the exclusive OR between the result and the lower 64-bit value, thereby reducing the number of bits of data for the CRC calculation to 80. Next, in response to the PCLMULQDQ instruction, the CPU 133 multiplies the upper 32-bit value by a constant to obtain a 48-bit value (1032), and calculates the exclusive OR between the result and the lower 48 bits of the 80-bit value (1031), thereby reducing the number of bits of data for the CRC calculation to 48. The result is R. Finally, the CPU 133 calculates a 16-bit CRC from 48-bit R based on an algorithm called Barrett Reduction. Specifically, the CPU 133 executes operations in the order of equations (3), (4), (5), and (6).

[Equation 3]

$$y = \text{Floor}(x^{48}/P(x)) \qquad (3)$$

[Equation 4]

$$T1(x) = \text{Floor}(R(x)/x^{16}) \cdot \mu \qquad (4)$$

[Equation 5]

$$T2(x) = \text{Floor}(T1(x)/x^{32}) \cdot P(x) \qquad (5)$$

[Equation 6]

$$C(x) = R(x) + T2(x) \bmod x^{16} \qquad (6)$$

Where, R(x) represents a polynomial including R, Floor represents an operation of leaving terms of order 0 or higher of x from the polynomial, and the symbol "+" represents a bitwise exclusive OR. The 16-bit value indicated by C(x) is the desired CRC. As described above, also for Barrett Reduction, carryless multiplications to which the PCLMULQDQ instruction is applicable are used two times.

The CPU 133 supports the PCLMULQDQ instruction, and also supports its vectorized VPCLMULQDQ instruction.

The CPU 133 executes CRC calculations of the four data blocks in parallel using the VPCLMULQDQ instruction. Specifically, the CRC calculation of four 512-byte data blocks is executed in parallel.

Figure 11A:
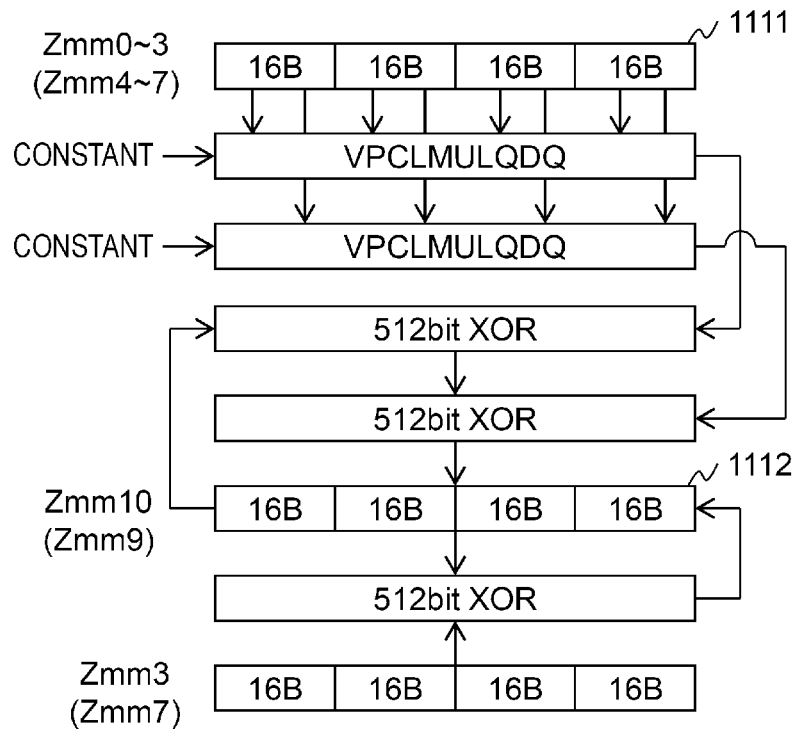
FIG. 11A is a diagram illustrating a method for calculating CRC in parallel in the storage system according to the first embodiment.
Figure 11B:
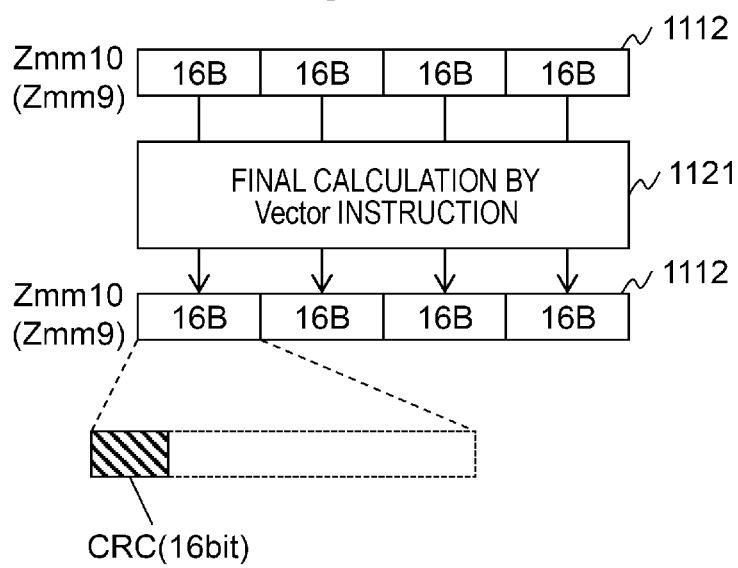
FIG. 11B is a diagram illustrating the method for calculating CRC in parallel in the storage system according to the first embodiment.

FIGS. 11A and 11B are diagrams illustrating a method for calculating CRC in parallel in the storage system 120 according to the first embodiment. This method is applied to the CRC calculations in steps S405 and S406 of FIG. 4 and steps S503 and S504 of FIG. 5.

FIG. 11A illustrates a method of binary data shortening process (corresponding to the entire processing of FIG. 10B) in parallel processing of CRC calculation of four data blocks by the CPU 133.

A Zmm register 1111 is a component of encryption/decryption input data or encryption/decryption output data in parallel processing of XTS encryption/decryption of four data blocks described with reference to FIGS. 7 to 9, and is a register that holds 16-byte data corresponding to four data blocks. Specifically, Zmm register 1111 refers to Zmm0, Zmm1, Zmm2, or Zmm3 registers for the XTS encryption/decryption input data, and refers to Zmm4, Zmm5, Zmm6, or Zmm7 registers for the XTS encryption/decryption output data.

According to the invention, shortening process of the target data for CRC calculation is performed in parallel using the data held by the Zmm register 1111 for XTS encryption/decryption. The 16-byte data of the Zmm register 1111 corresponds to a 128-bit value in which two 64-bit values indicated by H(x) and L(x) in FIG. 10B are arranged.

A Zmm register 1112 is a register that holds 128-bit binary data of four data blocks obtained during or after shortening process. Specifically, a Zmm10 register is indicated for CRC calculation of input data for XTS encryption/decryption, and the Zmm9 register is indicated for CRC calculation of output data for XTS encryption/decryption.

First, the CPU 133 executes the VPCLMULQDQ instruction to multiply the upper 64 bits of the 16-byte data of the Zmm register 1111 by the same constant (PP1). Four pieces of 128-bit data are output as the operation result. Next, the CPU 133 executes the VPCLMULQDQ instruction to multiply the lower 64 bits of each 16-byte data in the Zmm register by the same constant (PP2). Four pieces of 128-bit data are output as the operation result. The CPU 133 calculates the exclusive OR of these two results and the Zmm register 1112, and stores the result in the Zmm register 1112 again (PP3). The processes (PP1) to (PP3) correspond to one shortening process.

When the next 16-byte data is stored in the Zmm register 1111 in the parallel processing of XTS encryption/decryption of four data blocks, the CPU 133 repeats the shortening processes indicated by (PP1) to (PP3) The CPU 133 executes the shortening process 31 times, and when the Zmm register 1111 stores the last 16-byte data of the block (that is, the fourth data of Group7), the exclusive OR of the value of the Zmm register 1111 and the value of the Zmm register 1112 is calculated, and the result is stored in the Zmm register 1112 again.

FIG. 11B illustrates a method of final calculation (final process in FIG. 10B) in parallel processing of CRC calculation of 4-block data by the CPU 133.

The Zmm register 1112 holds four data blocks of 128-bit binary data used for final calculations. According to the invention, the final CRC calculation is executed in parallel using the data held in this Zmm register 1112. In this example, parallel final calculation 1121 is implemented by replacing the CPU instruction used for the final calculation in FIG. 10B with the corresponding Vector instruction. That is, the XOR instruction is replaced with the Vector XOR instruction, and the PCLMULQDQ instruction is replaced with the VPCLMULQDQ instruction. Likewise, each instruction that forms Barrett Reduction is also replaced with its corresponding Vector instruction. The final result of CRC calculation is stored in the Zmm register 1112. Specifically, a Zmm10 register is indicated for CRC calculation of input data for XTS encryption/decryption, and the Zmm9 register is indicated for CRC calculation of output data for XTS encryption/decryption. The locations at which the results of the four CRC calculations are stored are the head 16 bits of each 16 bytes of Zmm register 1112. It is to be noted that the remainder of each 16 bytes (112 bits) are unused at the time of the completion of the CRC calculation.

Figure 12A:
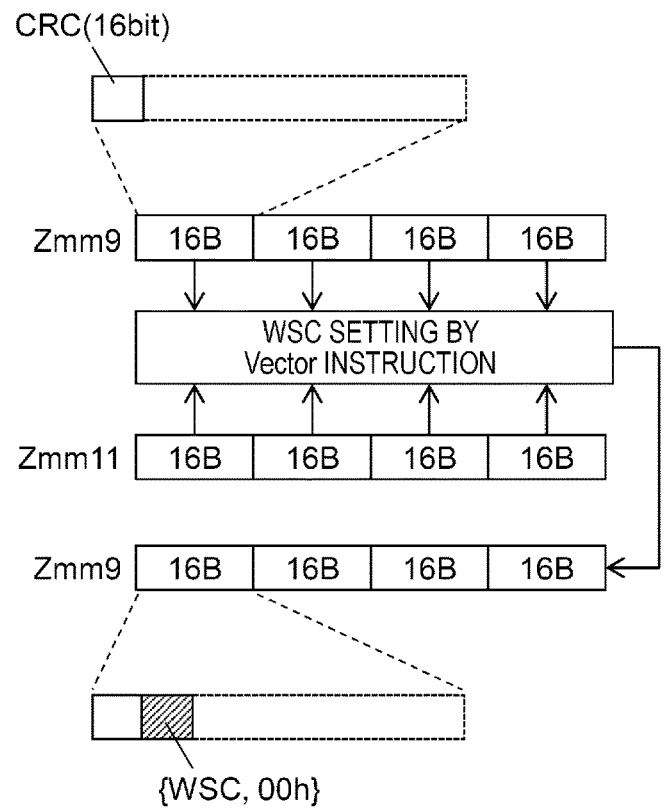
FIG. 12A is a diagram provided to explain a method for generating DIFs in parallel for four data blocks in the storage system of the first embodiment.
Figure 12B:
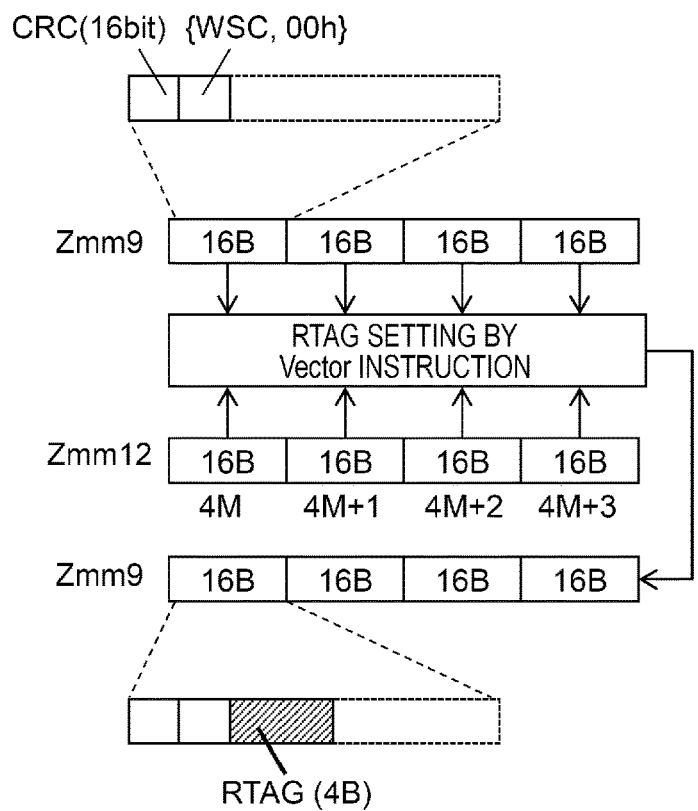
FIG. 12B is a diagram provided to explain the method for generating DIFs in parallel for four data blocks in the storage system of the first embodiment.

FIGS. 12A and 12B are diagrams provided to explain a method for generating DIFs in parallel for four data blocks in the storage system 120 of the first embodiment.

FIG. 12A illustrates a method in which the CPU 133 adds a 1-byte (8-bit) WSC in parallel to the subsequent portion of each CRC, with respect to the Zmm9 registers holding four CRCs calculated in parallel from the output data of XTS encryption/decryption according to the method illustrated in FIG. 11.

As described with reference to FIG. 3, in the WSC to be added, the HEAD 301 of the head block is 1, the HEAD 301 of the non-head block is 0, the TAIL 302 of the end block is 1, the TAIL 302 of the non-end block is 0, and the SQN of all data blocks is a common 6-bit value. A Zmm11 register holding a 512-bit pattern (however, 00h is set in each of the 8 bits of ATAG(1) 233 and 243.) including a WSC based on this setting rule is prepared and overwritten only on the 8-bit portion after each CRC of the Zmm9 register. For overwriting, for example, a vectorized MOV instruction with a bit mask is used. As a result, the Zmm9 register stores four sets of CRC and WSC.

For example, when the size of user data to write/read is 128 Kbytes (256 blocks), it is necessary that the parallel processing of adding WSC is performed 64 times. At the first addition, 1 is set in the HEAD 301 of the WSC of the DIF of the head block, and at the 64th addition, 1 is set in the TAIL 302 of the WSC of the end block DIF. 0 is set in the other HEAD 301 and TAIL 302.

FIG. 12B illustrates a method in which the CPU 133 adds a 4-byte RTAG 234, 244 in parallel to the subsequent portion of each ATAG(1) 233, 243 with respect to the Zmm9 register.

The RTAGs 234 and 244 to be added are addresses of four data blocks arranged in ascending order. A Zmm12 register storing a 512-bit pattern including the RTAG 234, 244 based on this setting rule is prepared and overwritten only in the 4-byte portion after each ATAG(1) 233, 234 of the Zmm9 register. For overwriting, a vectorized MOV instruction with a bit mask is used, for example. As a result, the Zmm9 register stores four DIFs (that is, a set of CRC, WSC, RTAG). This corresponds to the Zmm9 register holding the four DIFs to be added in FIG. 9. In response to store instruction from the Zmm9 register to the DRAM 134, a DIF is added to each end of the four output data blocks.

The parallel DIF generation method described above is applied to S411 in FIG. 4 and S509 in FIG. 5.

Figure 13A:
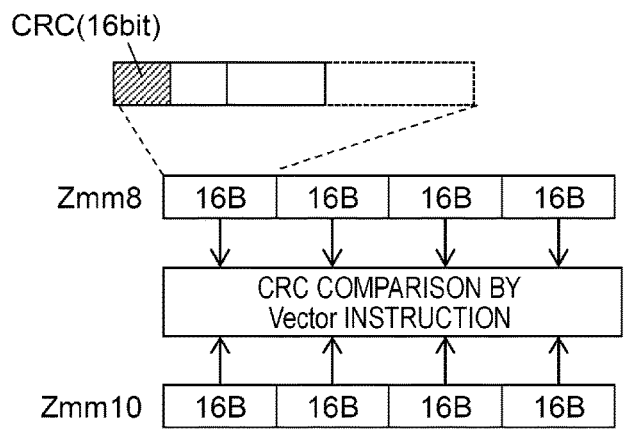
FIG. 13A is a diagram provided to explain a method for inspecting DIFs in parallel for four data blocks in the storage system of the first embodiment.
Figure 13B:
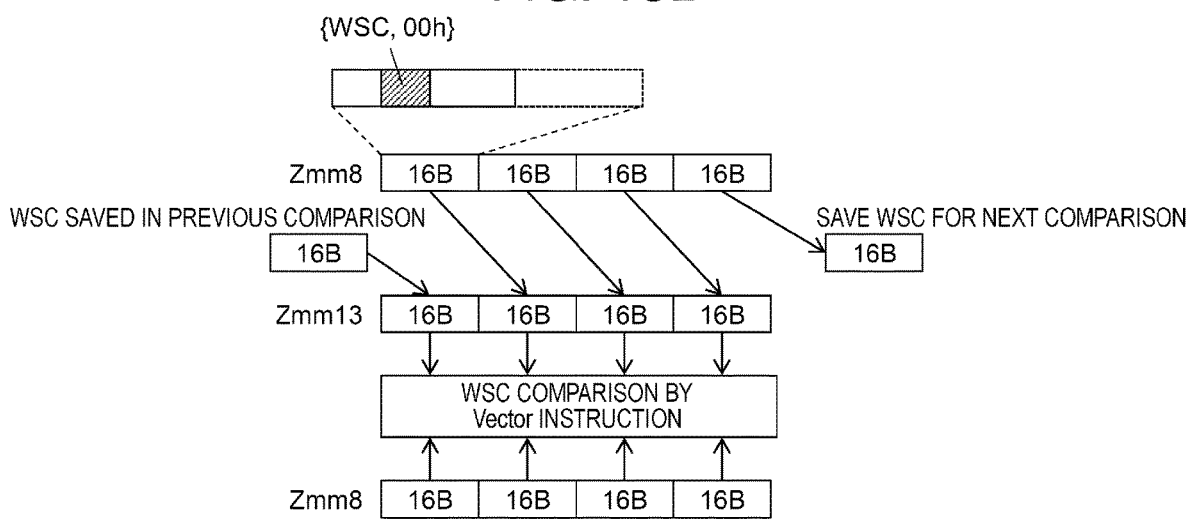
FIG. 13B is a diagram provided to explain the method for inspecting DIFs in parallel for four data blocks in the storage system of the first embodiment.
Figure 13C:
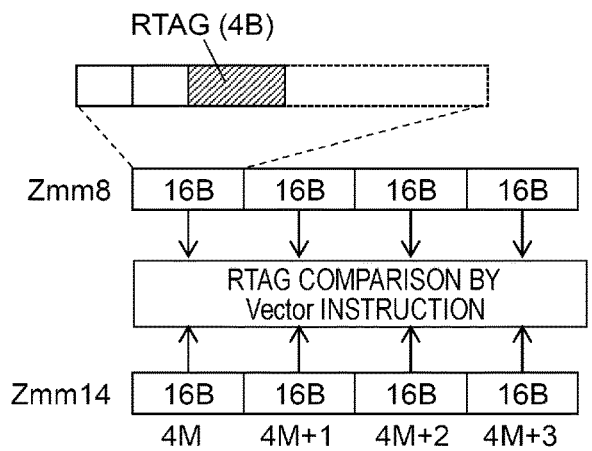
FIG. 13C is a diagram provided to explain the method for inspecting DIFs in parallel for four data blocks in the storage system of the first embodiment.

FIGS. 13A, 13B, and 13C are diagrams provided to explain a method for inspecting DIFs in parallel for four data blocks in the storage system 120 of the first embodiment.

In FIGS. 13A, 13B, and 13C, the Zmm8 register is the Zmm register that stores the DIFs (four in total) that follow each data block of the input data for XTS encryption/decryption in FIG. 8.

FIG. 13A illustrates a parallel inspection method for four CRCs using pairs of Zmm8 registers.

According to the method illustrated in FIG. 11, the Zmm10 registers hold four CRCs calculated in parallel from the input data for XTS encryption/decryption. It is inspected in parallel whether each of these CRCs matches the respective CRCs stored in the Zmm8 register. For this inspection, a vectorized COMPARE instruction with a bit mask is used, for example. As a result, when all four comparison results match, the CRC inspection is successful. This inspection method is applied to step S408 in FIG. 4 and step S506 in FIG. 5.

FIG. 13B illustrates a parallel inspection method for four WSCs using the Zmm8 register.

In a Zmm13 register, the lower 48 bytes hold the contents of the Zmm8 register shifted right by 16 bytes, and the upper 16 bytes hold the DIF of the previously inspected fourth block (that is, the address is 4N+3). It is inspected in parallel whether the SQN of each of these WSCs matches the SQN of the WSC in the Zmm8 register. For this inspection, a vectorized COMPARE instruction with a bit mask is used, for example.

However, the SQNs of WSCs that do not meet the conditions (R3) and (R4) illustrated in the table 320 of FIG. 3C are not inspected. In this case, for example, the mask parameter of the COMPARE instruction is partially set to zero.

After inspecting the WSC, the lower 16 bytes including the DIF of the fourth block on the Zmm8 register are saved to the register for the next WSC inspection. As a result, the WSC inspection is successful when all valid SQN comparisons (up to 4) match. In this way, by holding the WSC shifted by one block in the Zmm13 register, four SQN comparisons between the own WSC and the previous WSC can be executed at the same time by executing one Vector COMPARE instruction. This inspection method is applied to step S507 in FIG. 5.

For example, when the size of the user data to write/read is 128 Kbytes (256 blocks), it is necessary that parallel WSC inspection of four encrypted data blocks is performed 64 times. The lower 16 bytes including the DIF of the fourth block on the Zmm8 register are saved in the 1st to 63rd inspections, and transferred to the upper 16 bytes in the Zmm13 register in the 2nd to 64th inspections. The first inspection does not transfer anything to the upper 16 bytes of the Zmm13 register, but since the first WSC is not inspected, this location may include an invalid value.

FIG. 13C illustrates a parallel inspection method for four RTAGs using the Zmm8 register.

A Zmm14 register holds four addresses arranged in ascending order. It is inspected in parallel whether each of these addresses matches the corresponding RTAG on the Zmm8 register. For this inspection, a vectorized COMPARE instruction with a bit mask is used, for example. As a result, when all four addresses match, the RTAG inspection is successful. This inspection method is applied to step S409 in FIG. 4 and step S508 in FIG. 5.

In FIGS. 12 and 13, the Zmm register numbers (Zmm11 register, Zmm12 register, Zmm13 register, and Zmm14 register) used for DIF inspection/generation are examples, and other register numbers may be used.

As described above, the CPU 133 of the storage system 120 according to the invention can execute XTS encryption/decryption, CRC calculation, DIF generation, and DIF inspection in parallel using 512-bit Zmm registers and Vector instructions in write/read process. In addition, by following the Zmm register usage described above, the number of loads/stores between the Zmm registers and the DRAM 134 is reduced to a necessary minimum, minimizing overhead cycles other than data operation cycles.

When the size of the user data to write/read is 2048 U bytes (U is an integer), although it is necessary to perform 4-block parallel write/read process U times, the data reception in step S401, the data write in step S412, the data read in step S501, and the data transmission in step S512 may be collectively executed in one cycle without being executed separately U times.

The invention may use a 256-bit Ymm register holding two pieces of processing data instead of the 512-bit Zmm register holding four pieces of processing data. In that case, the XTS encryption/decryption, CRC calculation, DIF generation, and DIF inspection can all be processed in parallel in two-block by applying the Vector instruction to the Ymm register in the same manner as described above.

The invention has an effect of being able to execute the write process of encrypting user data received from the host computer 110 and storing the encrypted data in a storage device, and the read process of decrypting the encrypted user data stored in the storage device and transmitting the decrypted data to the host computer 110 at a higher speed than the related art.

Although one embodiment of the invention has been described above, this is an example for explaining the invention, and is not intended to limit the scope of the invention only to the embodiment. That is, the invention can be implemented in various other forms.

What is claimed is:

1. A computer that writes and reads user data including a plurality of data blocks, comprising:
a processor, a memory connected to the processor, a storage medium connected to the processor, and a connection interface connected to the processor,
wherein the processor includes a plurality of registers, and is configured to:
receive a request to write the user data;
store the user data written in response to the write request in the memory;
execute an encryption process of generating encrypted user data including a plurality of encrypted data blocks using the plurality of registers;
store a plurality of first data integrity fields in a first resister;
execute a first setting process to set a first address indicating a storage location of one of the plurality of encrypted data blocks in parallel to each of the plurality of first data integrity fields stored in the first register;
add one of the plurality of first data integrity fields including the first address to each of the plurality of encrypted data blocks in the encrypted user data, respectively; and
store the encrypted user data in the storage medium.

2. The computer according to claim 1,
wherein a first generation number representing a generation of writing of the data block can be set in the first data integrity field, and
wherein the processor is configured executes a second setting process to set the first generation number of the one of the plurality of encrypted data blocks in parallel to each of the plurality of first data integrity fields stored in the first register.

3. The computer according to claim 2,
wherein the processor is configured to:
receive a request to read the encrypted user data;
read the encrypted user data specified by the read request from the storage medium and store the read data in the memory;
execute decryption process for decrypting the encrypted user data using the plurality of registers;
store a plurality of second data integrity fields in a second register;
execute a third setting process to set a second address indicating a storage location of one of the plurality of encrypted data blocks in parallel to each of the plurality of second data integrity fields stored in the second register; and
add one of the plurality of second data integrity fields including the second address to each of the plurality of data blocks in the decrypted user data, respectively, and store a result in the memory.

4. The computer according to claim 3,
wherein a second generation number representing a generation of writing of the data block can be set in the second data integrity field, and
wherein the processor is configured to executes a fourth setting process to set the second generation number of the one of the plurality of encrypted data blocks in parallel to each of the plurality of second data integrity fields stored in the second register.

5. The computer according to claim 4,
wherein the processor uses Single Instruction/Multiple Data (SIMD) instructions to execute the first setting process in parallel, execute the second setting process in parallel, execute the third setting process in parallel, and execute the fourth setting process in parallel.

6. The computer according to claim 3,
wherein each of the plurality of second data integrity fields includes a first error code.

7. The computer according to claim 1,
wherein each of the plurality of first data integrity fields includes a first error code.

8. A computer that writes and reads user data including a plurality of data blocks, comprising:
a processor, a memory connected to the processor, a storage medium connected to the processor, and a connection interface connected to the processor,
wherein the processor includes a plurality of registers, and is configured to:
receive a request to write the user data;
store the user data written in response to the write request in the memory;
execute an encryption process of generating encrypted user data including a plurality of encrypted data blocks using the plurality of registers;
execute a first inspection process for detecting corruption of the user data using the plurality of registers;
store a plurality of first data integrity fields in a first register;

execute a first setting process to set a first address indicating a storage location of one of the plurality of encrypted data blocks in parallel to each of the plurality of first data integrity fields stored in the first register;
add one of the plurality of first data integrity fields including the first address to each of the plurality of encrypted data blocks in the encrypted user data, respectively; and
store the encrypted user data in the storage medium.

9. The computer according to claim 8,
wherein a first generation number representing a generation of writing of the data block can be set in the first data integrity field, and
the processor is configured executes a second setting process to set the first generation number of the one of the plurality of encrypted data blocks in parallel to each of the plurality of first data integrity fields stored in the first register.

10. The computer according to claim 9,
wherein the processor is configured to:
receive a request to read the encrypted user data;
read the encrypted user data specified by the read request from the storage medium and store the read data in the memory;
execute decryption process for decrypting the encrypted user data using the plurality of registers;
store a plurality of second data integrity fields in a second register;
execute a third setting process to set a second address indicating a storage location of one of the plurality of encrypted data blocks in parallel to each of the plurality of second data integrity fields stored in the second register;
add one of the plurality of second data integrity fields including the second address to each of the plurality of data blocks in the decrypted user data, respectively, and store a result in the memory,
execute a second inspection process for detecting corruption of the encrypted user data using the plurality of registers; and
store the user data in the memory.

11. The computer according to claim 10,
wherein the second data integrity field includes a second generation number representing a generation of writing of the data block, and
wherein the processor is configured to executes a fourth setting process to set the second generation number of the one of the plurality of encrypted data blocks in parallel to each of the plurality of second data integrity fields stored in the second register.

12. The computer according to claim 11,
wherein the processor uses Single Instruction/Multiple Data (SIMD) instructions to execute the first setting process in parallel, execute the second setting process in parallel, execute the third setting process in parallel, and execute the fourth setting process in parallel.

13. The computer according to claim 8,
wherein each of the plurality of first data integrity fields includes a first error code.

14. A data processing method executed by a computer that writes and reads user data including a plurality of data blocks,
wherein the computer includes a processor, a memory connected to the processor, a storage medium connected to the processor, and a connection interface connected to the processor,
the processor includes a plurality of registers, and
the data processing method comprises:
receiving, by the processor, a request to write the user data;
in response to the write request, storing, by the processor, the user data to write in the memory;
executing, by the processor, an encryption process of generating encrypted user data including a plurality of encrypted data blocks using the plurality of registers;
executing, by the processor, an inspection process to detect corruption of the user data using the plurality of registers;
storing a plurality of first data integrity fields in a first register;
executing a first setting process to set a first address indicating a storage location of one of the plurality of encrypted data blocks in parallel to each of the plurality of first data integrity fields stored in the first register;
adding one of the plurality of first data integrity fields including the first address to each of the plurality of encrypted data blocks in the encrypted user data, respectively; and
storing, by the processor, the encrypted user data on the storage medium.

15. The data processing method according to claim 14,
wherein each of the plurality of second data integrity fields includes a first error code.

* * * * *